(12) United States Patent
Kohno et al.

(10) Patent No.: US 7,443,599 B2
(45) Date of Patent: Oct. 28, 2008

(54) MAGNIFICATION VARYING OPTICAL SYSTEM AND IMAGE TAKING APPARATUS

(75) Inventors: Tetsuo Kohno, Suita (JP); Mamoru Terada, Sakai (JP); Yoshihito Souma, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/709,529

(22) Filed: Feb. 22, 2007

(65) Prior Publication Data

US 2007/0201143 A1     Aug. 30, 2007

(30) Foreign Application Priority Data

Feb. 28, 2006   (JP) .............................. 2006-053527

(51) Int. Cl.
*G02B 15/14* (2006.01)

(52) U.S. Cl. ....................... 359/682; 359/683; 359/684; 359/685; 359/686; 359/715; 359/781; 359/726

(58) Field of Classification Search ......... 359/680–686, 359/715, 726, 781
See application file for complete search history.

(56) References Cited

U.S. PATENT DOCUMENTS

| 7,079,328 B2 | 7/2006 | Kuba ........................... 359/689 |
| 7,227,706 B2 * | 6/2007 | Yagyu et al. ................. 359/686 |

FOREIGN PATENT DOCUMENTS

| JP | 2004-246043 A | 9/2004 |
| JP | 2005-156828 A | 6/2005 |

* cited by examiner

*Primary Examiner*—Evelyn A. Lester
(74) *Attorney, Agent, or Firm*—Sidley Austin LLP

(57) ABSTRACT

A magnification varying optical system that directs light from an object to an image sensor includes in order from the object side: a first lens unit having negative optical power and including an optical axis changing element that changes the optical axis; a second lens unit having positive optical power and including three lens elements; a third lens unit having negative optical power; and a fourth lens unit having positive optical power. In this magnification varying optical system, in magnification varying from the wide-angle end to the telephoto end, the first lens unit is stationary, the distance from the first lens unit to the second lens unit decreases, and the distance from the third lens unit to the fourth lens unit increases. The magnification varying optical system satisfies the specified conditions.

14 Claims, 9 Drawing Sheets

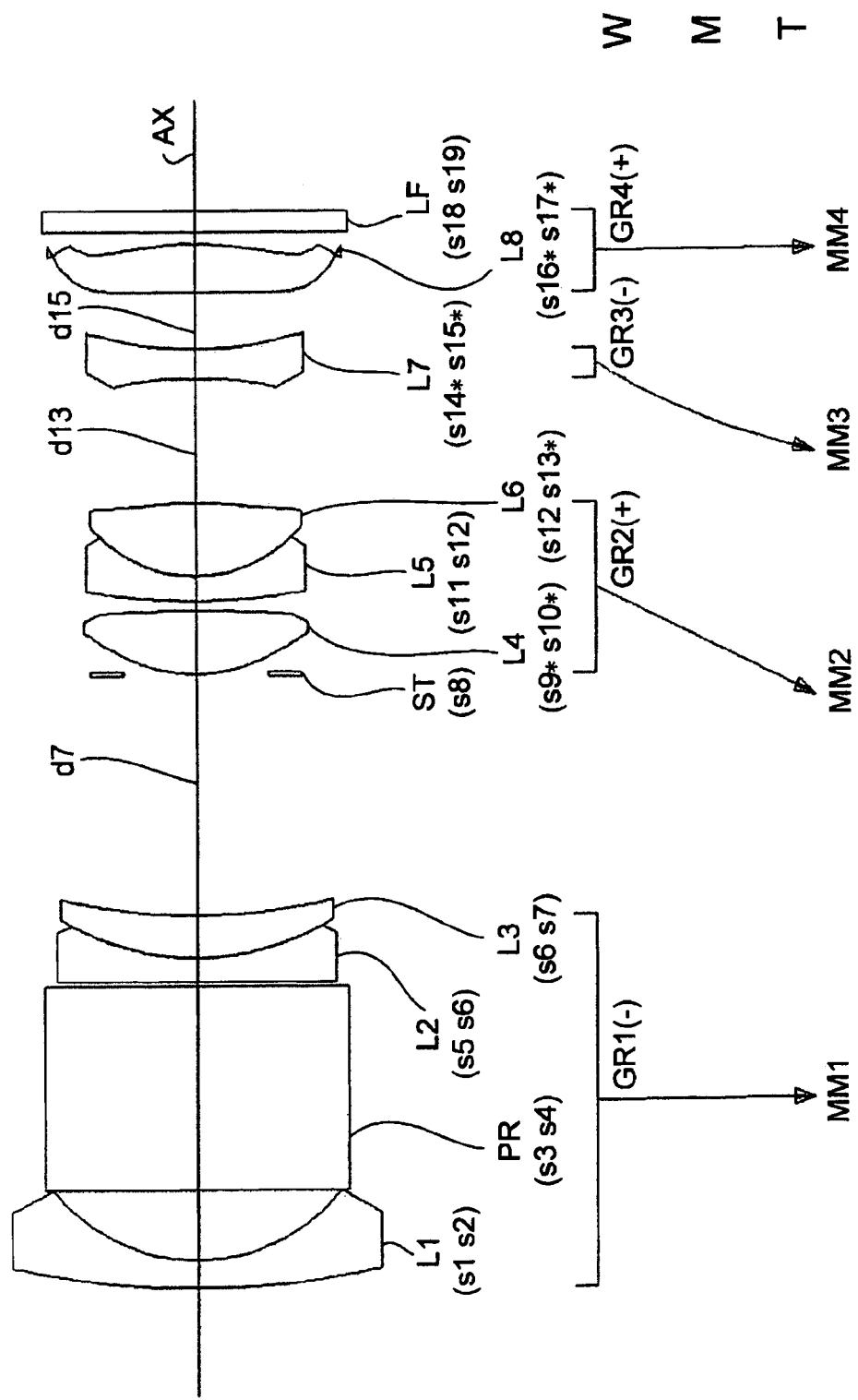

FNO=3.16 [W]
SPHERICAL ABERRATION SINE CONDITION

Y'=2.8 [W]
ASTIGMATISM

Y'=2.8 [W]
DISTORTION

FNO=4.49 [M]
SPHERICAL ABERRATION SINE CONDITION

Y'=2.8 [M]
ASTIGMATISM

Y'=2.8 [M]
DISTORTION

FNO=5.90 [T]
SPHERICAL ABERRATION SINE CONDITION

Y'=2.8 [T]
ASTIGMATISM

Y'=2.8 [T]
DISTORTION

FNO=3.16 [W]

-0.2  0.2
SPHERICAL  SINE
ABERRATION  CONDITION
— d
— · — g
- - - - SC

Y'=2.8 [W]

-0.2  0.2
ASTIGMATISM
- - - - DM
—— DS

Y'=2.8 [W]

-5.0  5.0
DISTORTION

FNO=4.48 [M]

-0.2  0.2
SPHERICAL  SINE
ABERRATION  CONDITION
— d
— · — g
- - - - SC

Y'=2.8 [M]

-0.2  0.2
ASTIGMATISM
- - - - DM
—— DS

Y'=2.8 [M]

-5.0  5.0
DISTORTION

FNO=5.90 [T]

-0.2  0.2
SPHERICAL  SINE
ABERRATION  CONDITION
— d
— · — g
- - - - SC

Y'=2.8 [T]

-0.2  0.2
ASTIGMATISM
- - - - DM
—— DS

Y'=2.8 [T]

-5.0  5.0
DISTORTION

FNO=3.35 [W]

-0.2  0.2
SPHERICAL  SINE
ABERRATION  CONDITION
— d
— g
--- SC

Y'=2.8 [W]

-0.2  0.2
ASTIGMATISM
--- DM
— DS

Y'=2.8 [W]

-5.0  5.0
DISTORTION

FNO=4.55 [M]

-0.2  0.2
SPHERICAL  SINE
ABERRATION  CONDITION
— d
— g
--- SC

Y'=2.8 [M]

-0.2  0.2
ASTIGMATISM
--- DM
— DS

Y'=2.8 [M]

-5.0  5.0
DISTORTION

FNO=5.90 [T]

-0.2  0.2
SPHERICAL  SINE
ABERRATION  CONDITION
— d
— g
--- SC

Y'=2.8 [T]

-0.2  0.2
ASTIGMATISM
--- DM
— DS

Y'=2.8 [T]

-5.0  5.0
DISTORTION

MAGNIFICATION VARYING OPTICAL SYSTEM AND IMAGE TAKING APPARATUS

This application is based on the application No. 2006-053527 filed in Japan Feb. 28, 2006, the entire content of which is hereby incorporated by reference.

BACKGROUND OF THE INVENTION

1. Field of the Invention

The present invention relates to a magnification varying optical system used for optical units and the like, and to an image taking apparatus having this magnification varying optical system.

2. Description of the Related Art

In recent years, with the spread of personal computers (PCs), digital still cameras (image taking apparatuses) with which images can be easily taken have been widespread. Such digital still cameras (DSCs) are also required to be smaller in size and thickness and to be higher in performance, for example, to have a high zooming function or a high aberration correcting function like cameras using silver halide film. For this reason, lens optical systems mounted on digital still cameras such as magnification varying optical systems are also required to be smaller in size and higher in performance.

It can be said that magnification varying optical systems in which a plurality of lens units are arranged in a line, so-called straight optical systems like those of Patent Documents 1 and 2 are unfit to be mounted on DSCs. This is because when the direction of the overall length of the magnification varying optical system and the direction of the depth of the DSC coincide with each other, the DSC becomes thick.

Therefore, recently, to realize the reduction of the thickness of DSCS, a magnification varying optical system has been developed the overall length of which is reduced by bending the light ray traveling from the object side to the image side, by an optical prism. Such a magnification varying optical system is disclosed, for example, in Patent Document 3. Such a magnification varying optical system the overall length of which is suppressed can be appropriately disposed in the limited space in the housing of the DSC. Consequently, the size of the housing and consequently, the size of the DSC are smaller and thinner.

[Patent Document 1] Japanese Laid-Open Patent Application No. 2004-246043

[Patent Document 2] Japanese Laid-Open Patent Application No. 2005-156828

[Patent Document 3] U.S. Pat. No. 7,079,328 B2

The optical power-arrangement of the magnification varying optical system of Patent Document 3 is negative, positive, negative from the object side to the image side, and realizes focusing at a short distance by moving the third lens unit of negative optical power from the object side, toward the image side. For this reason, in this magnification varying optical system, the shortest object distance is easily reduced.

However, in such a magnification varying optical system, a prism having a concave surface on the object side is situated on the most object side in the most object side first lens unit. For this reason, off-axial aberration due to this concave surface is apt to be caused. Then, to correct such off-axial aberration, it is necessary to provide many aspherical surfaces in the magnification varying optical system or to increase the overall length of the magnification varying optical system. For this reason, it cannot be said that the overall length of the magnification varying optical system of Patent Document 3 is sufficiently reduced. That is, it cannot be said that the magnification varying optical system of Patent Document 3 sufficiently satisfies the requirements, size reduction and performance enhancement.

SUMMARY OF THE INVENTION

The present invention is made to solve the above-mentioned problem, and an object thereof is to provide a high-performance and downsized magnification varying optical system and an image taking apparatus having same.

An aspect of the present invention is a magnification varying optical system that directs light from an object, to an image sensor and has a plurality of lens units, and in the magnification varying optical system, the plurality of lens units include, from the object side to the image side, at least: a first lens unit having negative optical power and including an optical axis changing element that changes the optical axis; a second lens unit having positive optical power and including three lens elements; a third lens unit having negative optical power; and a fourth lens unit having positive optical power.

In addition, in this magnification varying optical system, in magnification varying from the wide-angle end to the telephoto end, the first lens unit is stationary, the distance from the first lens unit to the second lens unit decreases, and the distance from the third lens unit to the fourth lens unit increases.

Further, the magnification varying optical system satisfies the following conditions:

$$-2.0 < f\_GR1\_o/fm < -0.5$$

$$-1.2 < [r\_GR2\_o + r\_GR2\_i]/[r\_GR2\_o - r\_GR2\_i] < 0$$

where f_GR1_o is the focal length of the lens element situated on the object side of the optical axis changing element in the first lens unit;

fm is $(fw \times ft)^{1/2}$;

fw is the overall focal length of the magnification varying optical system at the wide-angle end;

ft is the overall focal length of the magnification varying optical system at the telephoto end;

r_GR2_o is the radius of curvature of the object side surface of the most object side positive lens element in the second lens unit; and r_GR2_i is the radius of curvature of the image side surface of the most object side positive lens element in the second lens unit.

Another aspect of the present invention is an image taking apparatus having the above-described magnification varying optical system and an image sensor that converts the optical image formed by the magnification varying optical system, into an electric signal.

BRIEF DESCRIPTION OF THE DRAWINGS

These and other objects, advantages and features of the invention will become apparent from the following description thereof taken in conjunction with the preferred embodiments with the reference to the accompanying drawings in which:

FIG. 1 is a lens arrangement view showing a condition where a magnification varying optical system of a first example is developed in a line;

DETAILED DESCRIPTION OF THE PREFERRED EMBODIMENT

First Embodiment

A description of an embodiment of the present invention with reference to the drawings is as follows:

[1. Digital Still Camera]

Figure 17:
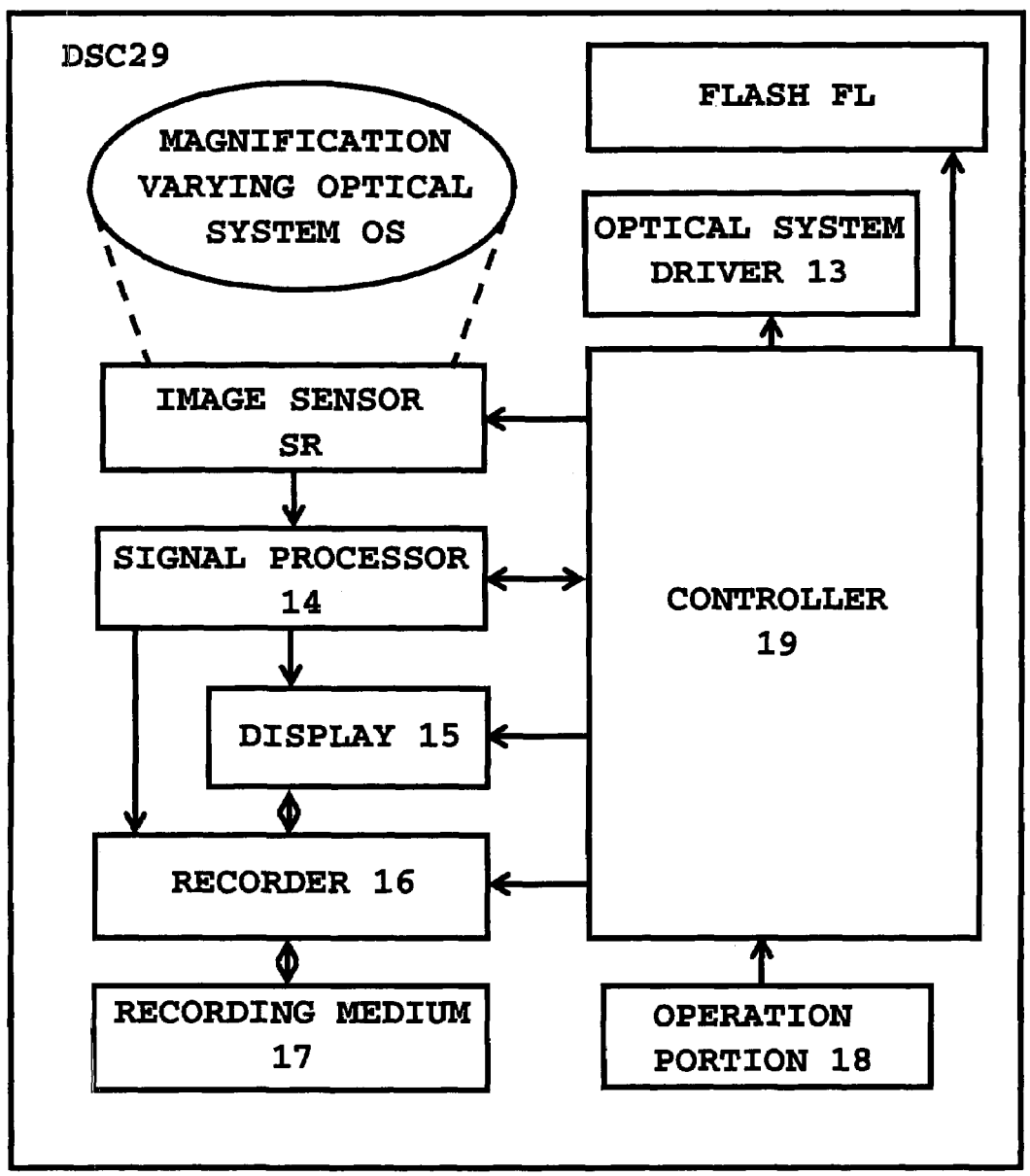
FIG. 17 is a block diagram showing the structure of an image taking apparatus (DSC).

FIG. 17 is a block diagram showing the structure of a digital still camera (DSC) 29 which is an example of the image taking apparatus of the present invention.

As shown in FIG. 17, the DSC 29 includes a magnification varying optical system OS, a flash FL, an optical system driver 13, an image sensor SR, a signal processor 14, a display 15, a recorder 16, a recording medium 17, an operation portion 18, and a controller 19.

The magnification varying optical system OS directs light from the object to be image-taken (object side) to the image sensor SR, and forms the light into an image on the light receiving plane (image plane) of the image sensor SR. Therefore, this magnification varying optical system OS may be expressed as an image forming optical system or an image taking optical system. Details of the magnification varying optical system OS will be described later.

The flash FL is a light source for easily enabling image taking by the image sensor SR by increasing the light (reflected light) from the subject by applying a light ray to the subject.

The optical system driver 13 has some driving motors (optical system driving motors) and a transmission mechanism (optical system transmission mechanism) that transmits the driving forces of the driving motors to the lens units included in the magnification varying optical system OS. The driving motors and the transmission mechanism are not shown. The optical system driver 13 sets the focal length and focal position of the magnification varying optical system OS by use of the driving motors and the transmission mechanism. Specifically, the optical system driver 13 sets the focal length and the focal position in response to an instruction from the controller 19.

The image sensor SR, which is, for example, an area sensor of a CCD (charge coupled device) or a CMOS (complementary metal oxide semiconductor) sensor, receives a light ray having passed through the magnification varying optical system OS, and converts it into an electric signal (image taking data). Then, the image sensor SR outputs this image taking data to the signal processor 14.

By processing the electronic data (image taking data) from the image sensor SR, the signal processor 14 generates taken image data based on the image taking data. The signal processor 14 turns on or off the processing operation in response to an instruction from the controller 19. Moreover, the signal processor 14 outputs the taken image data to the display 15 and the recorder 16 in response to an instruction from the controller 19.

The display 15, which comprises, for example, a liquid crystal panel, displays the taken image data from the signal processor 14 and the condition of use of the DSC 29.

The recorder 16 records the taken image data generated by the signal processor 14, onto the recording medium 17 in response to an instruction from the controller 19. Moreover, the recorder 16 reads the taken image data from the recording medium 17 in response to an instruction from the controller 19 according to an operation by the operation portion 18 or the like.

The recording medium 17 may be, for example, incorporated in the DSC 29 or detachably attachable like a flash memory. In short, it may be any medium capable of recording taken image data and the like, such as an optical disk or a semiconductor memory.

The operation portion 18 outputs various operation instructions from the user or the like, to the controller 19, and comprises, for example, a shutter release button and an operation dial.

The controller 19, which is the central part that controls the operation of the entire DSC 29, organically controls the driving of each member of the DSC 29, and performs centralized control of the operation.

[2. Magnification Varying Optical System]

<Structure of Magnification Varying Optical Systems of First to Fourth Examples (see FIGS. 1 to 16C)>

The magnification varying optical systems OS of the first to fourth examples will be described with reference to FIGS. 1 to 16C. FIGS. 1 to 4C are views related to the first example, FIGS. 5 to 8C, to the second example, FIGS. 9 to 12C, to the third example, and FIGS. 13 to 16C, to the fourth example.

FIGS. 1, 5, 9, and 13 are lens cross-sectional views showing a condition where the magnification varying optical systems OS of the first, second, third, and fourth examples are developed in a line, respectively. FIGS. 2A to 4C, 6A to 8C, 10A to 12C, and 14A to 16C are graphic representations of aberrations in the magnification varying optical systems OS of the first, second, third, and fourth examples, respectively.

In the figures, "GRi" represents lens units, and "Li" represents lens elements. Further, "si" represents lens surfaces (transmission surfaces, etc.). The numerals (i) suffixed to "GRi," "Li," and "si" indicate the order from the object side to the image side. Aspherical surfaces are marked with "* (asterisks)."

<<2-1-1. Structure of Magnification Varying Optical System of First Example (see FIG. 1)>>

The magnification varying optical system OS of the first example comprises, from the object to be image-taken, a first lens unit GR1, a second lens unit GR2, a third lens unit GR3, and a fourth lens unit GR4.

<<<<First Lens Unit>>>>

The first lens unit GR1 includes, from the object side, a first lens element L1, an optical prism (optical axis changing element) PR, a second lens element L2, and a third lens element L3. The overall optical power (refractive power) of the first lens unit GR1 is "negative (−)." The optical power is defined by the reciprocal of the focal length.

The lens elements and the optical prism have the following characteristics:

The first lens element L1 is a negative meniscus lens convex to the object side.

The optical prism PR is a prism that perpendicularly bends the light ray from the object side, and is a rectangular prism in the present embodiment. In the optical prism PR, s3 represents the plane on which the light ray is incident, and s4 represents the surface from which the light ray exits.

The second lens element L2 is a plano-concave lens having a plane surface on the object side.

The third lens element L3 is a positive meniscus lens convex to the object side.

The second lens element L2 and the third lens element L3 constitute a doublet lens bonded together at the surface s6. Examples of the bonding method include bonding by an adhesive agent or the like. Examples of the bonding method of the doublet lenses described later also include bonding by an adhesive agent or the like.

<<<<Second Lens Unit>>>>

The second lens unit GR2 includes, from the object side, an optical diaphragm ST, a fourth lens element L4 (positive lens element having a convex surface at least on the object side), a fifth lens element L5, and a sixth lens element L6. The overall optical power of the second lens unit GR2 is "positive (+)."

The optical diaphragm ST and the lens elements have the following characteristics:

The optical diaphragm ST is a diaphragm that partly intercepts the light ray having passed through the first lens unit GR1, and is also denoted as s8. This optical diaphragm ST is formed integrally with the second lens unit GR2.

The fourth lens unit L4 is a bi-convex positive lens (here, s9* and s10* are aspherical surfaces).

The fifth lens element L5 is a negative meniscus lens convex to the object side.

The sixth lens element L6 is a bi-convex positive lens (here, s13* is an aspherical surface).

The fifth lens element L5 and the sixth lens element L6 constitute a doublet lens by being bonded together at the surface s12. The above-mentioned aspherical surfaces mean dioptric surfaces having an aspherical configuration, surfaces having a refractive property equivalent to that of an aspherical surface, and the like.

<<<<Third Lens Unit>>>>

The third lens unit GR3 includes only the seventh lens element L7. The overall optical power of the third lens unit GR3 (substantially, the seventh lens element L7) is negative.

The seventh lens element L7 has the following characteristic:

The seventh lens element L7 is a bi-concave negative lens (here, s14* and s15* are aspherical surfaces).

<<<<Fourth Lens Unit>>>>

The fourth lens unit GR4 includes an eighth lens element L8 and a low-pass filter LF. The overall optical power of the fourth lens unit GR4 is positive.

The eighth lens element L8 and the low-pass filter LF have the following characteristics:

The eighth lens element L8 is a positive meniscus lens concave to the object side (here, s16* and s17* are aspherical surfaces).

The low-pass filter LF is an optical filter having two surfaces (s18, s19), and has a predetermined cut-off frequency characteristic determined by the pixel pitch of the image sensor SR.

In the first example and the succeeding examples, the image sensor SR is situated on the image side of the low-pass filter LF. A unit including the image sensor SR and the magnification varying optical system OS may be called an optical unit.

<<2-1-2. Structure of the Magnification Varying Optical System of Second Example (see FIG. 5)>>

The magnification varying optical system OS of the second embodiment comprises, from the object to be image-taken, a first lens unit GR1, a second lens unit GR2, a third lens unit GR3, and a fourth lens unit GR4. The optical power arrangement is negative, positive, negative, positive like that of the first example.

<<<<First Lens Unit>>>>

The first lens unit GR1 includes, from the object side, a first lens element L1, an optical prism PR, a second lens element L2, and a third lens element L3.

The lens elements and the optical prism have the following characteristics:

The first lens element L1 is a negative meniscus lens convex to the object side.

The optical prism PR is a prism that perpendicularly bends the light ray from the object side like that of the first example. In the optical prism PR, s3 represents the plane on which the light ray is incident, and s4 represents the surface from which the light ray exits.

The second lens element L2 is a negative meniscus lens convex to the object side.

The third lens element L3 is a positive meniscus lens convex to the object side.

The second lens element L2 and the third lens element L3 constitute a doublet lens by being bonded together at the surface s6.

<<<<Second Lens Unit>>>>

The second lens unit GR2 includes, from the object side, an optical diaphragm ST, a fourth lens element L4, a fifth lens element L5, a sixth lens element L6, and a light intercepting plate TT.

The optical diaphragm ST, the lens elements, and the light intercepting plate TT have the following characteristics:

The optical diaphragm ST is a diaphragm that partly intercepts the light ray having passed through the first lens unit GR1 like that of the first example, and is also denoted as s8. This optical diaphragm ST is formed integrally with the second lens unit GR2 like that of the first example.

The fourth lens unit L4 is a bi-convex positive lens (here, s9* and s10* are aspherical surfaces).

The fifth lens element L5 is a negative meniscus lens convex to the object side.

The sixth lens element L6 is a bi-convex positive lens (here, s13* is an aspherical surface).

The light intercepting plate TT is a light intercepting plate for preventing unnecessary off-axial light from reaching the image sensor SR, and is also denoted as s14. The light intercepting plate TT is formed integrally with the third lens unit GR3.

The fifth lens element L5 and the sixth lens element L6 constitute a doublet lens by being bonded together at the surface s12.

<<<<Third Lens Unit>>>>

The third lens unit GR3 includes only the seventh lens element L7 from the object side. The seventh lens element L7 has the following characteristic:

The seventh lens element L7 is a bi-concave negative lens (here, s15* and s16* are aspherical surfaces).

<<<<Fourth Lens Unit>>>>

The fourth lens unit GR4 includes an eighth lens element L8 and a low-pass filter LF. The eighth lens element L8 and the low-pass filter LF have the following characteristics:

The eighth lens element L8 is a bi-convex positive lens (here, s17* and s18* are aspherical surfaces).

The low-pass filter LF is an optical filter similar to that of the first example having two surfaces (s19, s20).

<<2-1-3. Structure of Magnification Varying Optical System of Third Example (see FIG. 9)>>

The magnification varying optical system OS of the third example also comprises, from the object to be image-taken, a first lens unit GR1, a second lens unit GR2, a third lens unit GR3, and a fourth lens unit GR4. Like those of the first and second examples, the optical power arrangement is "negative, positive, negative, positive."

<<<<First Lens Unit>>>>

The first lens unit GR1 includes, from the object side, a first lens element L1, an optical prism PR, a second lens element L2, and a third lens element L3.

The lens elements and the optical prism PR have the following characteristics:

The first lens element L1 is a negative meniscus lens convex to the object side.

The optical prism PR is a prism that perpendicularly bends the light ray from the object side like those of the first and second examples. In the optical prism PR, s3 represents the plane on which the light ray is incident, and s4 represents the surface from which the light ray exits.

The second lens element L2 is a negative meniscus lens concave to the object side.

The third lens element L3 is a positive meniscus lens concave to the object side.

The second lens element L2 and the third lens element L3 constitute a doublet lens by being bonded together at the surface s6.

<<<<Second Lens Unit>>>>

The second lens unit GR2 includes, from the object side, an optical diaphragm ST, a fourth lens element L4, a fifth lens element L5, and a sixth lens element L6.

The optical diaphragm ST and the lens elements have the following characteristics:

The optical diaphragm ST is a diaphragm that partly intercepts the light ray having passed through the first lens unit GR1 like those of the first and second examples, and is also denoted as s8. This optical diaphragm ST is formed integrally with the second lens unit GR2 like those of the first and second examples.

The fourth lens element L4 is a bi-convex positive lens (here, s9* and s10* are aspherical surfaces).

The fifth lens element L5 is a negative meniscus lens convex to the object side.

The sixth lens element L6 is a bi-convex positive lens.

<<<<Third Lens Unit>>>>

The third lens unit GR3 includes only the seventh lens element L7 from the object side. The seventh lens element L7 has the following characteristic:

The seventh lens element L7 is a negative meniscus lens convex to the object side (here, s15* and s16* are aspherical surfaces).

<<<<Fourth Lens Unit>>>>

The fourth lens unit GR4 includes an eighth lens element L8 and a low-pass filter LF. The eighth lens element L8 and the low-pass filter LF have the following characteristics:

The eighth lens element L8 is a positive meniscus lens concave to the object side (here, s17* and s18* are aspherical surfaces).

The low-pass filter LF is an optical filter similar to those of the first and second examples having two surfaces (s19, s20).

<<2-1-4. Structure of Magnification Varying Optical System of Fourth Example (see FIG. 13)>>

The magnification varying optical system OS of the fourth example also comprises, from the object to be image-taken, a first lens unit GR1, a second lens unit GR2, a third lens unit GR3, and a fourth lens unit GR4. Like those of the first and second examples, the optical power arrangement is "negative, positive, negative, positive."

<<<<First Lens Unit>>>>

The first lens unit GR1 includes, from the object side, a first lens element L1, an optical prism PR, a second lens element L2, and a third lens element L3.

The lens elements and the optical prism PR have the following characteristics:

The first lens element L1 is a negative meniscus lens convex to the object side.

The optical prism PR is a prism that perpendicularly bends the light ray from the object side like those of the first to third examples. In the optical prism PR, s3 represents the plane on which the light ray is incident, and s4 represents the surface from which the light ray exits.

The second lens element L2 is a bi-concave negative lens.

The third lens element L3 is a positive meniscus lens convex to the object side.

The second lens element L2 and the third lens element L3 constitute a doublet lens by being bonded together at the surface s6.

<<<<Second Lens Unit>>>>

The second lens unit GR2 includes, from the object side, an optical diaphragm ST, a fourth lens element L4, a fifth lens element L5, and a sixth lens element L6.

The optical diaphragm ST and the lens elements have the following characteristics:

The optical diaphragm ST is a diaphragm that partly intercepts the light ray having passed through the first lens unit GR1 like those of the first to third examples, and is also denoted as s8. This optical diaphragm ST is formed integrally with the second lens unit GR2 like those of the first to third examples.

The fourth lens element L4 is a bi-convex positive lens (here, s9* and s10* are aspherical surfaces).

The fifth lens element L5 is a positive meniscus lens concave to the object side.

The sixth lens element L6 is a negative meniscus lens convex to the object side.

<<<<Third Lens Unit>>>>

The third lens unit GR3 includes only the seventh lens element L7 from the object side. The seventh lens element L7 has the following characteristic:

The seventh lens element L7 is a bi-concave negative lens (here, s15* and s16* are aspherical surfaces).

<<<<Fourth Lens Unit>>>>

The fourth lens unit GR4 includes an eighth lens element L8 and a low-pass filter LF. The eighth lens element L8 and the low-pass filter LF have the following characteristics:

The eighth lens element L8 is a bi-convex positive lens (here, s17* and s18* are aspherical surfaces).

The low-pass filter LF is an optical filter similar to those of the first to third examples having two surfaces (s19, s20).

respectively. The refractive index (Nd) and the Abbe number (vd) are to the d-line (the wavelength 587.56 nm).

The "focal length condition" means the wide-angle condition (W, the shortest focal length condition) to the middle focal length condition (M) to the telephoto condition (T, the longest focal length condition). Moreover, "f" and "FNO." represent the overall focal length [unit: mm] and the f-number in the focal length conditions (W), (M), and (T), respectively.

The above-mentioned aspherical surfaces are defined by the following expression (defining expression 1):

$$X(H)=C_0 \cdot H^2 / \{1+(1-\epsilon \cdot C_0^2 \cdot H^2)^{1/2}\} + \Sigma Aj \cdot H^j \quad \text{(Expression 1)}$$

Here, H is the height in a direction vertical to the optical axis AX,

X(H) is the displacement amount (sag) in the direction of the optical axis AX in the position of a height H, $C_0$ is the paraxial curvature (=1/ri), $\epsilon$ is a quadric surface parameter, j is the degree of the aspherical surface, and Aj is the j-th order aspherical coefficient.

Aspherical data related to the aspherical surfaces is shown in Tables 2, 4, 6, and 8. Here, the coefficients of the terms not shown are "0" (zero), and for all the data, "E-n" means "x10⁻ⁿ."

<<2-2-1. Construction Data of Magnification Varying Optical System of First Example>>

TABLE 1

| | FOCAL LENGTH CONDITION | (W)~(M)~(T) |
|---|---|---|
| EXAMPLE 1 | f[mm] | 4.01~6.78~11.04 |
| | FNo. | 3.17~4.49~5.90 |

| i | ri[mm] | | i | di[mm] | i | Ni | vi | | |
|---|---|---|---|---|---|---|---|---|---|
| 1 | 19.490 | | 1 | 0.700 | 1 | 1.91048 | 31.32 | L1 | GR1 |
| 2 | 4.371 | | 2 | 1.742 | | | | | (−) |
| 3 | ∞ | | 3 | 5.000 | 2 | 1.91048 | 31.32 | PR | |
| 4 | ∞ | | 4 | 0.100 | | | | | |
| 5 | ∞ | | 5 | 0.610 | 3 | 1.53431 | 48.84 | L2 | |
| 6 | 6.207 | | 6 | 1.042 | 4 | 1.93323 | 20.88 | L3 | |
| 7 | 13.811 | | 7 | 5.953~3.223~0.500 | | | | ST | GR2 |
| 8 | ∞ | | 8 | 0.010 | | | | | (+) |
| 9 | 3.629 | * | 9 | 1.540 | 5 | 1.59142 | 61.25 | L4 | |
| 10 | −39.845 | * | 10 | 0.245 | | | | | |
| 11 | 15.321 | | 11 | 0.610 | 6 | 1.91048 | 31.32 | L5 | |
| 12 | 3.282 | | 12 | 1.799 | 7 | 1.59142 | 61.25 | L6 | |
| 13 | −10.094 | * | 13 | 3.095~3.012~4.044 | | | | | GR3 |
| 14 | −10.835 | * | 14 | 0.700 | 8 | 1.83972 | 37.28 | L7 | (−) |
| 15 | 9.346 | * | 15 | 1.387~4.200~5.892 | | | | | GR4 |
| 16 | −54.796 | * | 16 | 1.174 | 9 | 1.60783 | 28.30 | L8 | (+) |
| 17 | −6.058 | * | 17 | 0.300 | | | | | |
| 18 | ∞ | | 18 | 0.500 | 10 | 1.51872 | 64.20 | LF | |
| 19 | ∞ | | | | | | | | |

<2-2. Construction Data of Magnification Varying Optical Systems of First to Fourth Examples>

Next, the construction data of the magnification varying optical systems OS of the first to fourth examples is shown in Tables 1 to 8, and will be described with reference to these tables.

In these tables, "ri" represents the radius of curvature [unit: mm] of each surface (si), aspherical surfaces are marked with asterisks (*) and "di" represents the axial distance [unit: mm] between an i-th surface (si) and an (i+1)-th surface (si+1). When the axial distance (unit-to-unit distance) is varied due to zooming, di in the wide-angle condition (W), di in the middle focal length condition (M), and di in the telephoto condition (T) are shown in this order.

"Ni" and "vi" represent the refractive index (Nd) and the Abbe number (vd) of the medium at the axial distance (di),

TABLE 2

| EXAMPLE 1 | |
|---|---|
| 9th SURFACE | |
| ε | 1.0000 |
| A4 | −0.20174370E−02 |
| A6 | 0.32920560E−03 |
| A8 | −0.13486729E−03 |
| A10 | 0.79547726E−05 |
| 10th SURFACE | |
| ε | 1.0000 |
| A4 | 0.25725140E−03 |
| A6 | 0.55210656E−03 |

TABLE 2-continued

EXAMPLE 1

| | |
|---|---|
| A8 | −0.26707073E−03 |
| A10 | 0.24394270E−04 |
| 13th SURFACE | |
| ϵ | 1.0000 |
| A4 | 0.29086070E−02 |
| A6 | −0.43441258E−03 |
| A8 | 0.37963307E−03 |
| A10 | −0.46505203E−04 |
| 14th SURFACE | |
| ϵ | 1.0000 |
| A4 | −0.61190375E−02 |
| A6 | 0.33172416E−02 |
| A8 | −0.72960722E−03 |
| A10 | 0.31793106E−04 |
| 15th SURFACE | |
| ϵ | 1.0000 |
| A4 | −0.46294312E−02 |
| A6 | 0.35502266E−02 |
| A8 | −0.70774457E−03 |
| A10 | 0.42497607E−04 |
| 16th SURFACE | |
| ϵ | 1.0000 |
| A4 | 0.16073875E−02 |
| A6 | 0.11637869E−03 |
| A8 | 0.31835839E−04 |
| A10 | −0.17113415E−06 |
| 17th SURFACE | |
| ϵ | 1.0000 |
| A4 | 0.75413753E−02 |
| A6 | 0.12754936E−03 |
| A8 | −0.93628145E−04 |
| A10 | 0.11323149E−04 |

<<2-2-2. Construction Data of Magnification Varying Optical System of Second Example>>

TABLE 3

| FOCAL LENGTH CONDITION | (W)~(M)~(T) |
|---|---|
| EXAMPLE 2 f[mm] | 4.16~7.03~11.45 |
| FNo. | 3.16~4.48~5.90 |

| i | ri[mm] | | i | di[mm] | i | Ni | νi | |
|---|---|---|---|---|---|---|---|---|
| 1 | 19.693 | | 1 | 0.700 | 1 | 1.91048 | 31.32 | L1 GR1 |
| 2 | 4.413 | | 2 | 1.724 | | | | (−) |
| 3 | ∞ | | 3 | 5.036 | 2 | 1.91048 | 31.32 | PR |
| 4 | ∞ | | 4 | 0.100 | | | | |
| 5 | 215.123 | | 5 | 0.610 | 3 | 1.55098 | 45.82 | L2 |
| 6 | 6.291 | | 6 | 1.072 | 4 | 1.93323 | 20.88 | L3 |
| 7 | 14.855 | | 7 | 6.179~3.331~0.500 | | | | ST GR2 |
| 8 | ∞ | | 8 | 0.010 | | | | (+) |
| 9 | 3.702 | * | 9 | 1.718 | 5 | 1.59142 | 61.25 | L4 |
| 10 | −12.974 | * | 10 | 0.400 | | | | |
| 11 | 64.148 | | 11 | 0.610 | 6 | 1.91048 | 31.32 | L5 |
| 12 | 3.486 | | 12 | 1.781 | 7 | 1.59142 | 61.25 | L6 |
| 13 | −8.953 | * | 13 | 1.380 | | | | TT |
| 14 | ∞ | | 14 | 1.551~1.475~2.471 | | | | GR3 |
| 15 | −4.680 | * | 15 | 0.700 | 8 | 1.53275 | 55.72 | L7 (−) |
| 16 | 9.980 | * | 16 | 1.375~4.298~6.134 | | | | GR4 |
| 17 | 284.335 | * | 17 | 1.261 | 9 | 1.53275 | 55.72 | L8 (+) |
| 18 | −5.848 | * | 18 | 0.300 | | | | |
| 19 | ∞ | | 19 | 0.500 | 10 | 1.51872 | 64.20 | PT |
| 20 | ∞ | | | | | | | |

TABLE 4

EXAMPLE 2

| | |
|---|---|
| 9th SURFACE | |
| ϵ | 1.0000 |
| A4 | −0.18845755E−02 |
| A6 | 0.18596127E−03 |
| A8 | −0.86416259E−04 |
| A10 | 0.15971820E−05 |
| 10th SURFACE | |
| ϵ | 1.0000 |
| A4 | 0.12928863E−02 |
| A6 | 0.17813523E−03 |
| A8 | −0.15091142E−03 |
| A10 | 0.99616474E−05 |
| 13th SURFACE | |
| ϵ | 1.0000 |
| A4 | 0.21336633E−02 |
| A6 | −0.95149079E−04 |
| A8 | 0.26624698E−03 |
| A10 | −0.31507478E−04 |
| 14th SURFACE | |
| ϵ | 1.0000 |
| A4 | 0.49088360E−02 |
| A6 | −0.62328671E−03 |
| A8 | 0.59087216E−03 |
| A10 | −0.16675098E−03 |
| 15th SURFACE | |
| ϵ | 1.0000 |
| A4 | 0.55001313E−02 |
| A6 | −0.93985898E−04 |
| A8 | 0.23011233E−03 |
| A10 | −0.62803299E−04 |
| 16th SURFACE | |
| ϵ | 1.0000 |
| A4 | 0.16846161E−02 |
| A6 | 0.63003384E−03 |

TABLE 4-continued

| EXAMPLE 2 | |
|---|---|
| A8 | −0.53711702E−04 |
| A10 | 0.40711588E−05 |
| 17th SURFACE | |
| ε | 1.0000 |
| A4 | 0.35796040E−02 |
| A6 | 0.20512717E−02 |
| A8 | −0.33032995E−03 |
| A10 | 0.21622267E−04 |

<<2-2-3. Construction Data of Magnification Varying Optical System of Third Example>>

TABLE 5

| | FOCAL LENGTH CONDITION | | (W)~(M)~(T) | | | | |
|---|---|---|---|---|---|---|---|
| EXAMPLE 3 | f[mm] | | 4.00~6.80~11.00 | | | | |
| | FNo. | | 3.37~4.66~5.90 | | | | |
| i | ri[mm] | i | di[mm] | i | Ni | νi | |

| i | ri[mm] | | i | di[mm] | i | Ni | νi | | |
|---|---|---|---|---|---|---|---|---|---|
| 1 | 11.947 | | 1 | 0.70 | 1 | 1.883000 | 40.80 | L1 | GR1 |
| 2 | 5.257 | | 2 | 1.32 | | | | | (−) |
| 3 | ∞ | | 3 | 5.44 | 2 | 1.903660 | 31.32 | PR | |
| 4 | ∞ | | 4 | 0.76 | | | | | |
| 5 | −5.678 | | 5 | 0.60 | 3 | 1.883000 | 40.80 | L2 | |
| 6 | −51.128 | | 6 | 0.85 | 4 | 1.922860 | 20.88 | L3 | |
| 7 | −13.549 | | 7 | 5.63~3.00~0.50 | | | | | |
| 8 | ∞ | | 8 | 0.01 | | | | ST | GR2 |
| 9 | 4.305 | * | 9 | 1.33 | 5 | 1.737157 | 53.56 | L4 | (+) |
| 10 | −12.437 | * | 10 | 0.48 | | | | | |
| 11 | 10.239 | | 11 | 0.60 | 6 | 1.901279 | 22.95 | L5 | |
| 12 | 4.115 | | 12 | 1.04 | | | | | |
| 13 | 17.209 | | 13 | 1.57 | 7 | 1.560060 | 46.64 | L6 | |
| 14 | −6.009 | | 14 | 1.83~2.23~3.80 | | | | | |
| 15 | 29.386 | * | 15 | 0.80 | 8 | 1.922860 | 20.90 | L7 | GR3 |
| 16 | 3.718 | * | 16 | 1.88~4.14~5.05 | | | | | (−) |
| 17 | −19.328 | * | 17 | 1.91 | 9 | 1.887052 | 30.73 | L8 | GR4 |
| 18 | −3.999 | * | 18 | 0.10 | | | | | (+) |
| 19 | ∞ | | 19 | 0.50 | 10 | 1.516800 | 64.20 | PT | |
| 20 | ∞ | | | | | | | | |

TABLE 6

| EXAMPLE 3 | |
|---|---|
| 9th SURFACE | |
| ε | 1.0000 |
| A4 | 4.00013E−04 |
| A6 | 9.30561E−05 |
| A8 | 7.77925E−05 |
| A10 | 6.40504E−06 |
| 10th SURFACE | |
| ε | 1.0000 |
| A4 | 4.60310E−03 |
| A6 | 1.81608E−04 |
| A8 | 6.75485E−05 |
| A10 | 1.97513E−05 |
| 15th SURFACE | |
| ε | 1.0000 |
| A4 | −1.00098E−03 |
| A6 | 6.67886E−04 |
| A8 | −9.03758E−04 |
| A10 | 1.57520E−04 |

TABLE 6-continued

| EXAMPLE 3 | |
|---|---|
| 16th SURFACE | |
| ε | 1.0000 |
| A4 | −2.52755E−04 |
| A6 | 3.35727E−03 |
| A8 | −2.23914E−03 |
| A10 | 3.62113E−04 |
| 17th SURFACE | |
| ε | 1.0000 |
| A4 | −1.00060E−02 |

TABLE 6-continued

| EXAMPLE 3 | |
|---|---|
| A6 | 2.15997E−03 |
| A8 | −1.32152E−04 |
| A10 | 3.21246E−06 |
| 18th SURFACE | |
| ε | 1.0000 |
| A4 | −3.70313E−03 |
| A6 | 9.13626E−04 |
| A8 | −3.11991E−06 |
| A10 | −2.83677E−07 |

<<2-2-4. Construction Data of Magnification Varying Optical System of Fourth Example>>

TABLE 7

| | FOCAL LENGTH CONDITION | | | | (W)~(M)~(T) | | | |
|---|---|---|---|---|---|---|---|---|
| EXAMPLE 4 | f[mm] | | | | 3.95~6.55~10.86 | | | |
| | FNo. | | | | 3.35~4.55~5.90 | | | |
| i | ri[mm] | | i | di[mm] | i | Ni | νi | |
| 1 | 69.479 | | 1 | 0.70 | 1 | 1.883000 | 40.80 | L1 GR1 |
| 2 | 6.657 | | 2 | 1.09 | | | | (−) |
| 3 | ∞ | | 3 | 5.46 | 2 | 1.903660 | 31.32 | PR |
| 4 | ∞ | | 4 | 0.60 | | | | |
| 5 | −13.576 | | 5 | 0.60 | 3 | 1.497201 | 81.55 | L2 |
| 6 | 10.781 | | 6 | 1.02 | 4 | 1.922860 | 20.90 | L3 |
| 7 | 17.813 | | 7 | 5.64~3.08~0.61 | | | | ST GR2 |
| 8 | ∞ | | 8 | 0.01 | | | | (+) |
| 9 | 4.310 | * | 9 | 1.36 | 5 | 1.571720 | 67.89 | L4 |
| 10 | −10.261 | * | 10 | 0.10 | | | | |
| 11 | −42.894 | | 11 | 1.36 | 6 | 1.497000 | 81.60 | L5 |
| 12 | −3.872 | | 12 | 0.10 | | | | |
| 13 | 36.058 | | 13 | 0.60 | 7 | 1.912359 | 23.87 | L6 |
| 14 | 8.834 | | 14 | 2.27~2.69~3.99 | | | | GR3 |
| 15 | −41.630 | * | 15 | 0.60 | 8 | 1.896235 | 30.78 | L7 (−) |
| 16 | 3.849 | * | 16 | 1.57~3.71~4.89 | | | | GR4 |
| 17 | 20.977 | * | 17 | 2.21 | 9 | 1.609187 | 36.59 | L8 (+) |
| 18 | −4.908 | * | 18 | 0.79 | | | | |
| 19 | ∞ | | 19 | 0.50 | 10 | 1.516800 | 64.20 | PT |
| 20 | ∞ | | | | | | | |

TABLE 8

EXAMPLE 4

9th SURFACE

| ε | 1.0000 |
|---|---|
| A4 | −2.03981E−03 |
| A6 | 2.43385E−05 |
| A8 | −2.76659E−05 |
| A10 | −1.54798E−06 |

10th SURFACE

| ε | 1.0000 |
|---|---|
| A4 | 5.78711E−03 |
| A6 | 4.29310E−04 |
| A8 | −1.17696E−04 |
| A10 | −2.40153E−06 |

15th SURFACE

| ε | 1.0000 |
|---|---|
| A4 | 2.92529E−03 |
| A6 | 3.80886E−03 |
| A8 | −3.55056E−03 |
| A10 | 7.52145E−04 |

16th SURFACE

| ε | 1.0000 |
|---|---|
| A4 | 5.07606E−03 |
| A6 | 8.18169E−03 |
| A8 | −5.49817E−03 |
| A10 | 1.08780E−03 |

17th SURFACE

| ε | 1.0000 |
|---|---|
| A4 | −7.03617E−03 |
| A6 | 8.23226E−04 |
| A8 | −2.94718E−05 |
| A10 | 4.76135E−07 |

18th SURFACE

| ε | 1.0000 |
|---|---|
| A4 | −4.15659E−03 |
| A6 | 4.07666E−04 |

<2-3. Movements of Lens Units in Magnification Varying Optical Systems of First to Fourth Examples>

Movements of the lens units (GR1 to GR4) of the magnification varying optical systems OS of the first to fourth examples will be described with reference to FIGS. 1, 5, 9, and 13. Normally, at the time of zooming (magnification varying) from the wide-angle end to the telephoto end, the magnification varying optical system OS varies the distances between lens units along the optical axis AX. For example, in the magnification varying optical systems OS of the first to fourth examples, the first lens unit GR1 and the fourth lens unit GR4 are stationary, and the other lens units GR2 and GR3 are moved.

For example, in the magnification varying optical systems of the first and second examples, by moving the second lens unit GR2 and the third lens unit GR3 toward the object side, the unit-to-unit distance between the first lens unit GR1 and the second lens unit GR2 is reduced, the unit-to-unit distance between the second lens unit GR2 and the third lens unit GR3 is first reduced and then, increased, and the unit-to-unit distance between the third lens unit GR3 and the fourth lens unit GR4 is increased.

On the other hand, in the magnification varying optical systems of the third and fourth examples, by moving the second lens unit GR2 and the third lens unit GR3 toward the object side, the unit-to-unit distance between the first lens unit GR1 and the second lens unit GR2 is reduced, the unit-to-unit distance between the second lens unit GR2 and the third lens unit GR3 is increased, and the unit-to-unit distance between the third lens unit GR3 and the fourth lens unit GR4 is increased.

Therefore, in FIGS. 1, 5, 9, and 13, only the axial distances (di) that vary due to zooming are numbered. For example, in the case of the first example, d7, d13, and d15 are shown, in the case of the second example, d7, d14, and d16 are shown. In the case of the third and fourth examples, d7, d14, and d16 are shown.

The arrows "MMi" in the figures schematically show the movements of the lens units from the telephoto condition (W) to the middle focal length condition (M) and from the middle focal length condition (M) to the telephoto condition (T). Here, i of MMi represents the order from the object side to the image side. Therefore, it corresponds to the order of the lens units.

In the case of focusing (achieving in-focus state), in the magnification varying optical systems OS of the first to fourth examples, the third lens unit GR3 is moved.

<2-4. Aberrations in Magnification Varying Optical Systems of First to Fourth Examples>

Aberrations in the magnification varying optical systems of the first, second, third, and fourth examples in zooming are shown in FIGS. 2A to 4C, FIGS. 6A to 8C, FIGS. 10A to 12C, and FIGS. 14A to 16C. Expressions of FIGS. 6A to 8C, FIGS. 10A to 12C, and FIGS. 14A to 16C are similar to those of FIGS. 2A to 4C.

Figure 2A:
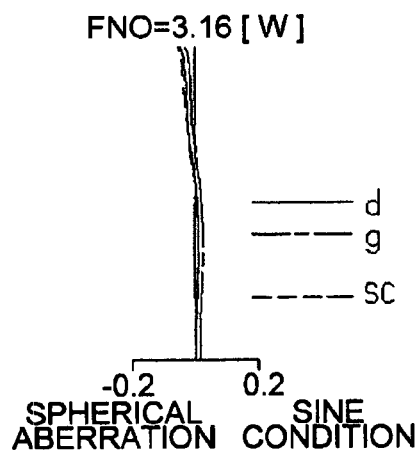
FIGS. 2A, 2B, and 2C are graphic representations of spherical aberration, astigmatism, and distortion, at the wide-angle end, of the magnification varying optical system of the first example, respectively.
Figure 2B:
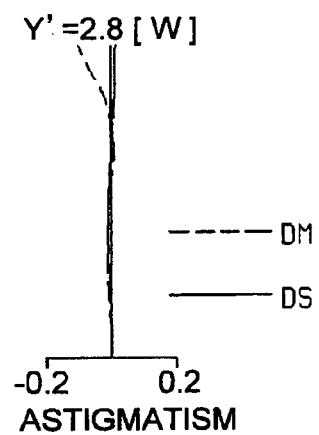
Figure 2C:
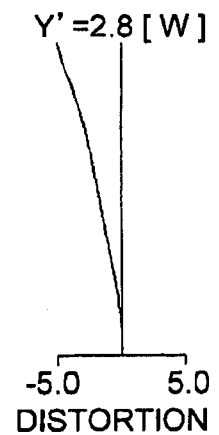
Figure 3A:
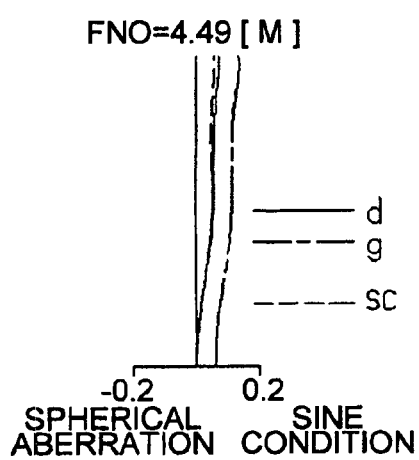
FIGS. 3A, 3B, and 3C are graphic representations of spherical aberration, astigmatism, and distortion, in the middle focal length condition, of the magnification varying-optical system of the first example, respectively.
Figure 3B:
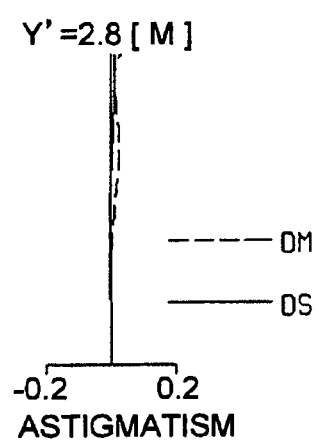
Figure 3C:
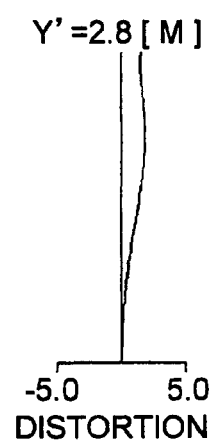
Figure 4A:
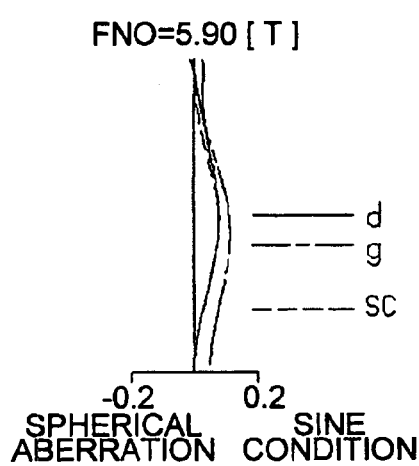
FIGS. 4A, 4B, and 4C are graphic representations of spherical aberration, astigmatism, and distortion, at the telephoto end, of the magnification varying optical system of the first example, respectively.
Figure 4B:
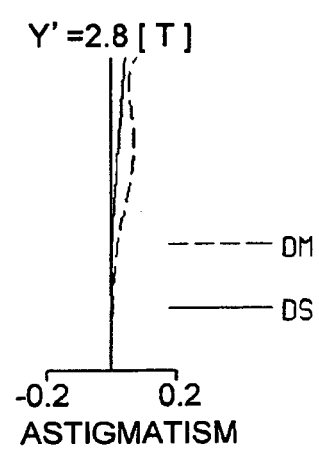
Figure 4C:
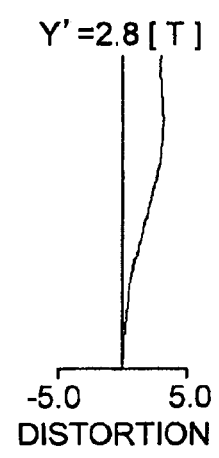
Figure 5:
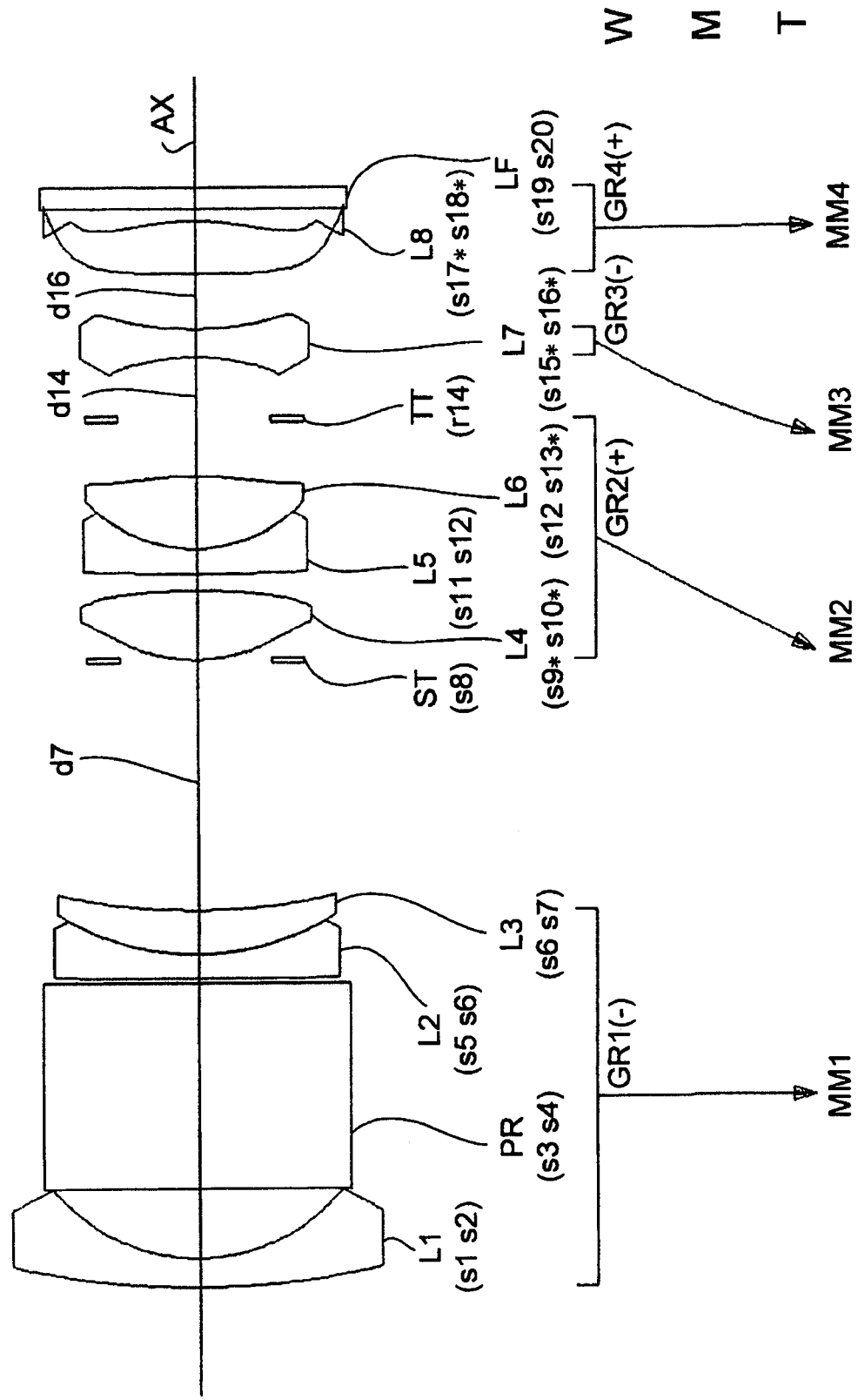
FIG. 5 is a lens arrangement view showing a condition where a magnification varying optical system of a second example is developed in a line.
Figure 6A:
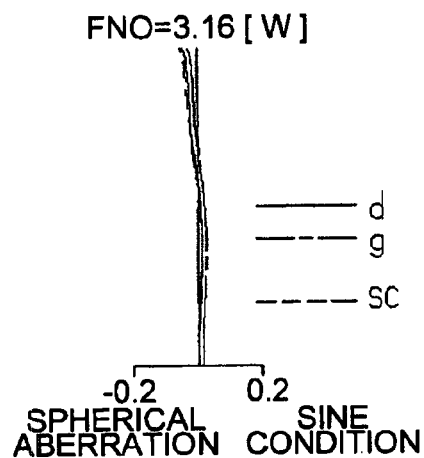
FIGS. 6A, 6B, and 6C are graphic representations of spherical aberration, astigmatism, and distortion, at the wide-angle end, of the magnification varying optical system of the second example, respectively.
Figure 6B:
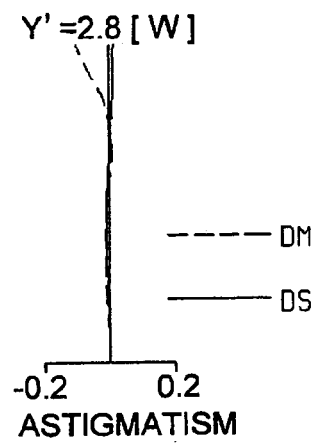
Figure 6C:
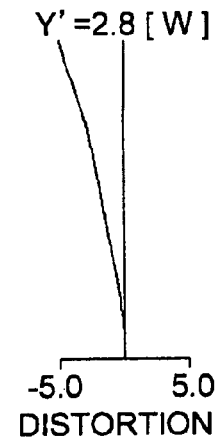
Figure 7A:
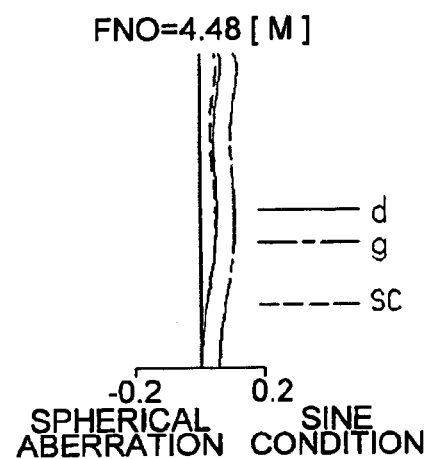
FIGS. 7A, 7B, and 7C are graphic representations of spherical aberration, astigmatism, and distortion, in the middle focal length condition, of the magnification varying optical system of the second example, respectively.
Figure 7B:
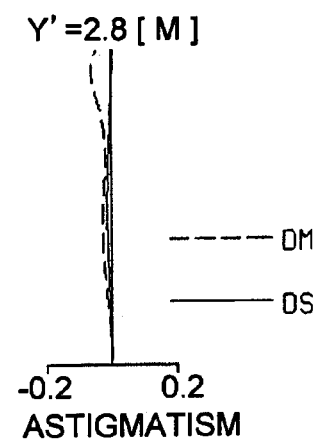
Figure 7C:
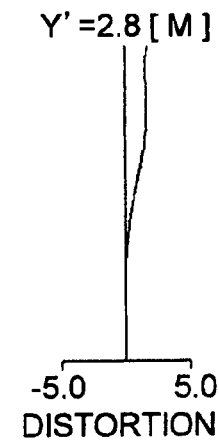
Figure 8A:
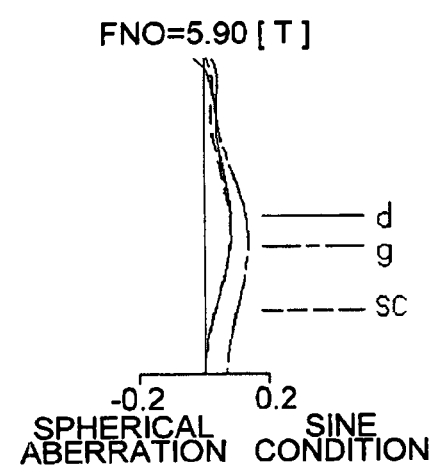
FIGS. 8A, 8B, and 8C are graphic representations of spherical aberration, astigmatism, and distortion, at the telephoto end, of the magnification varying optical system of the second example, respectively.
Figure 8B:
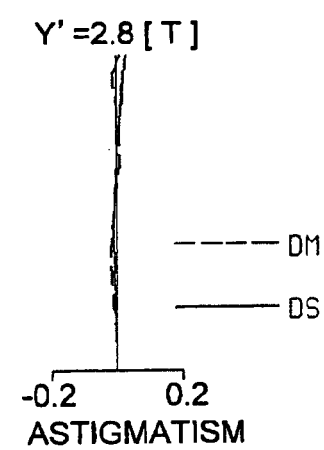
Figure 8C:
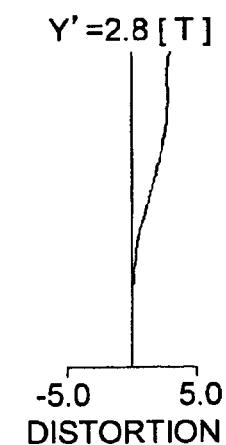
Figure 9:
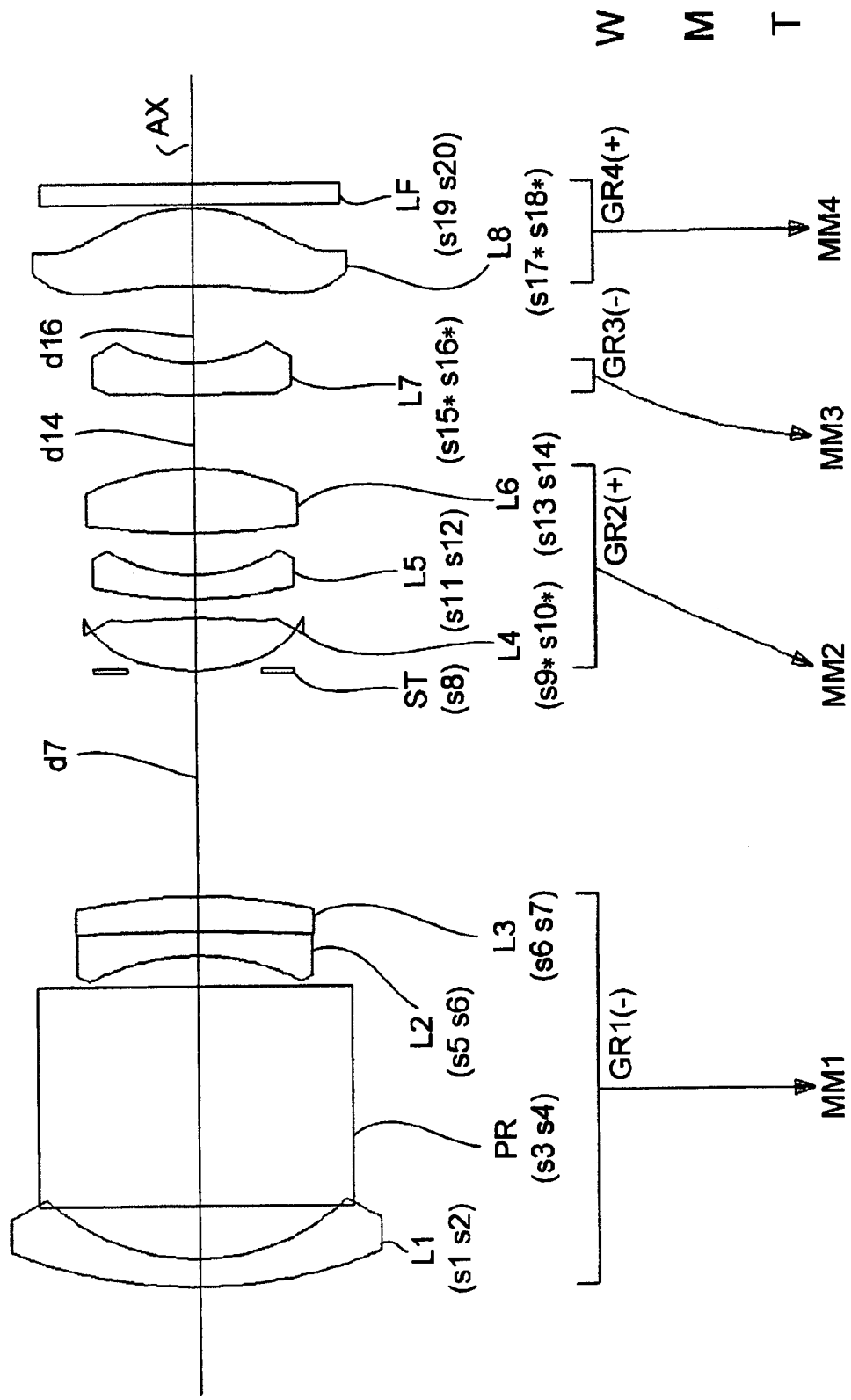
FIG. 9 is a lens arrangement view showing a condition where a magnification varying optical system of a third example is developed in a line.
Figures 10A, 10B, 10C:
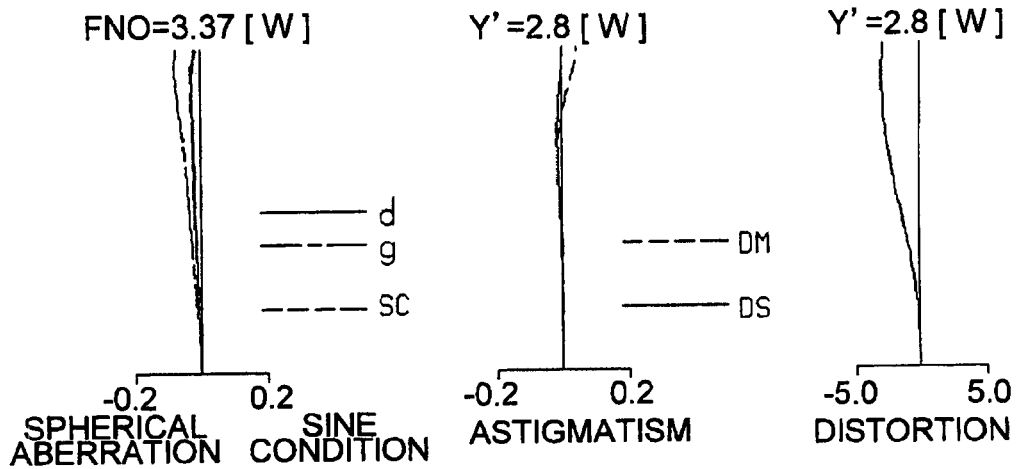
FIGS. 10A, 10B, and 10C are graphic representations of spherical aberration, astigmatism, and distortion, at the wide-angle end, of the magnification varying optical system of the third example, respectively.
Figures 11A, 11B, 11C:
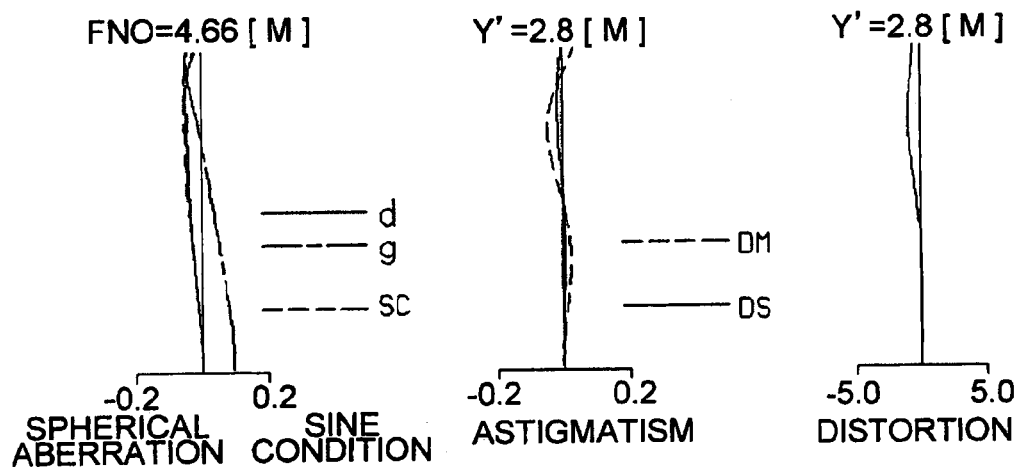
FIGS. 11A, 11B, and 11C are graphic representations of spherical aberration, astigmatism, and distortion, in the middle focal length condition, of the magnification varying optical system of the third example, respectively.
Figures 12A, 12B, 12C:
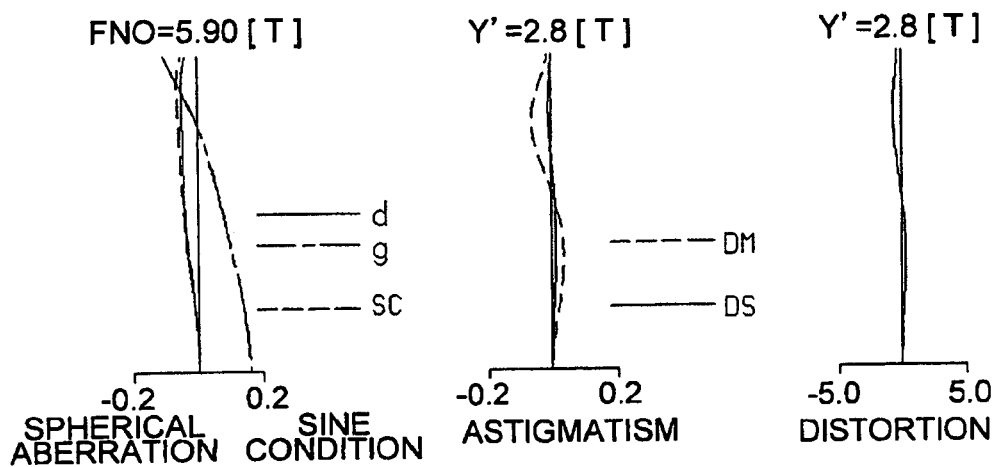
FIGS. 12A, 12B, and 12C are graphic representations of spherical aberration, astigmatism, and distortion, at the telephoto end, of the magnification varying optical system of the third example, respectively.
Figure 13:
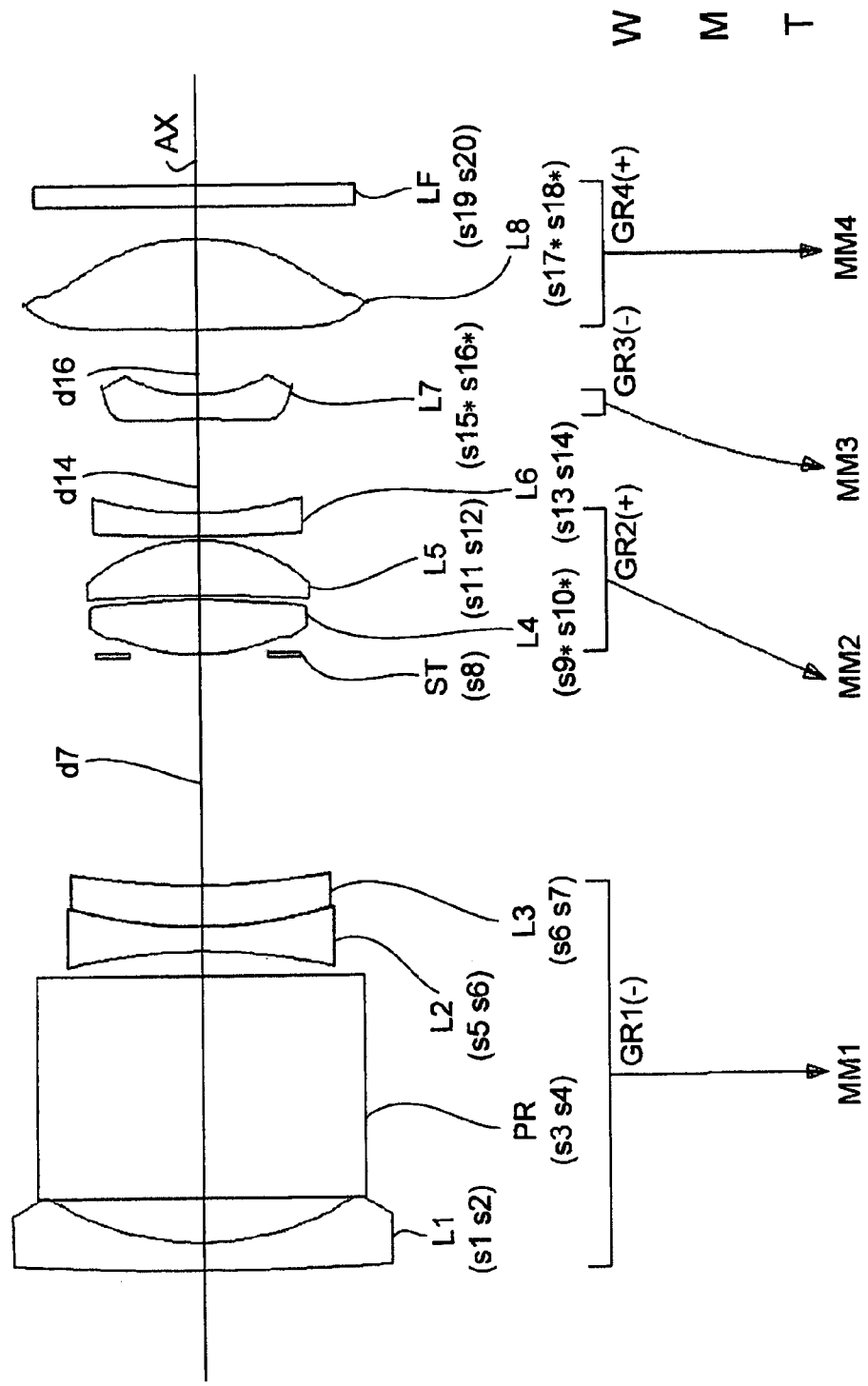
FIG. 13 is a lens arrangement view showing a condition where a magnification varying optical system of a fourth example is developed in a line.
Figure 14A:
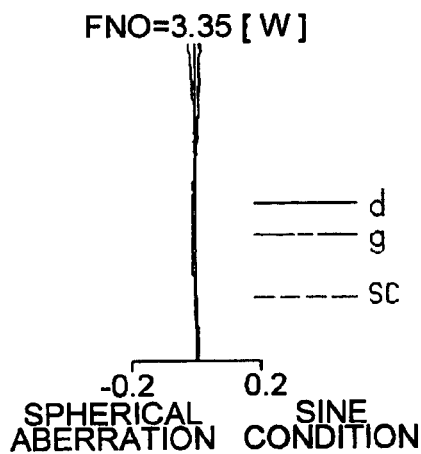
FIGS. 14A, 14B, and 14C are graphic representations of spherical aberration, astigmatism, and distortion, at the wide-angle end, of the magnification varying optical system of the fourth example, respectively.
Figure 14B:
Figure 14C:
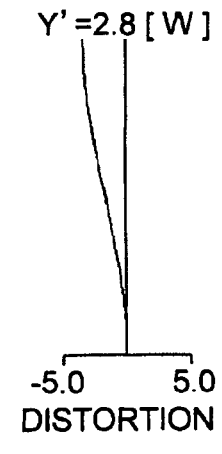
Figure 15A:
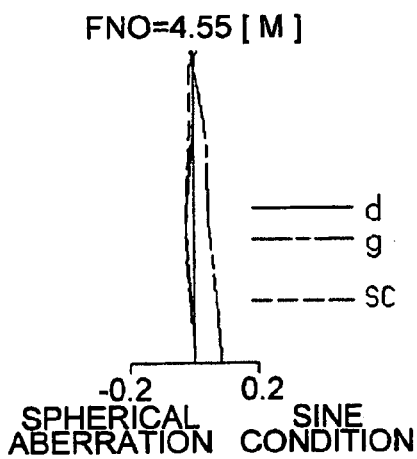
FIGS. 15A, 15B, and 15C are graphic representations of spherical aberration, astigmatism, and distortion, in the middle focal length condition, of the magnification varying optical system of the fourth example, respectively.
Figure 15B:
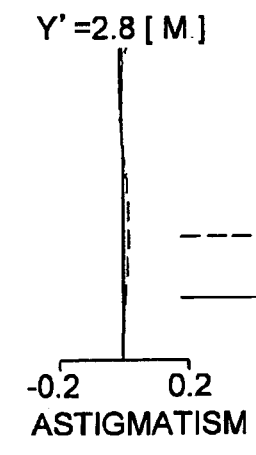
Figure 15C:
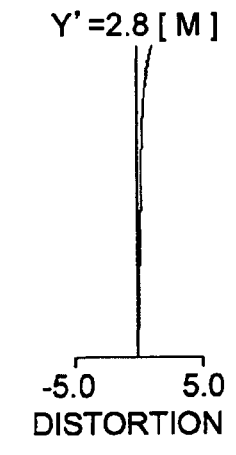
Figure 16A:
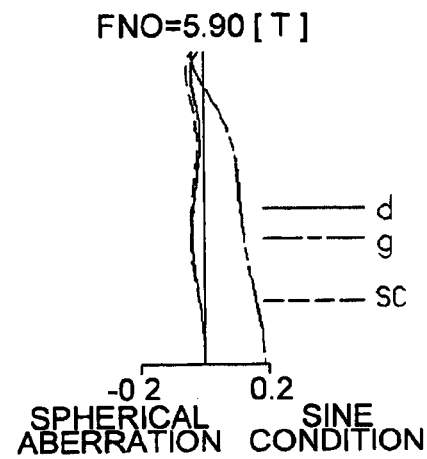
FIGS. 16A, 16B, and 16C are graphic representations of spherical aberration, astigmatism, and distortion, at the telephoto end, of the magnification varying optical system of the fourth example, respectively.
Figure 16B:
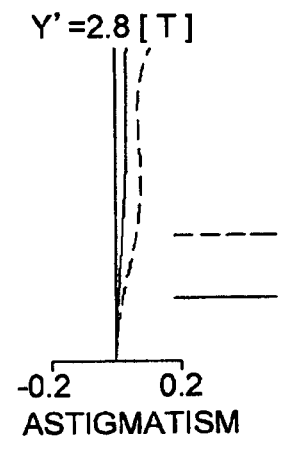
Figure 16C:
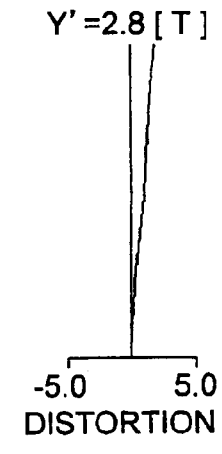

Specifically, FIGS. 2A to 2C show aberrations in the wide-angle condition (W), FIGS. 3A to 3C are aberrations in the middle focal length condition (M), and FIGS. 4A to 4C are aberrations in the telephoto condition (T).

FIGS. 2A, 3A, and 4A show the spherical aberration and the offence against the sine condition. The longitudinal axes in these figures represent the incident height, and the lines represent the following:

Line d: The spherical aberration [mm] to the d-line (wavelength 587.6 nm)
Line g: The spherical aberration [mm] to the g-line (wavelength 435.8 nm)
Line SC: The offence against the since condition [mm]

FIGS. 2B, 3C, and 4B show the astigmatism. In these figures, the longitudinal axes represent the image height (Y' [mm]), the line DM (broken line) represents the astigmatism [mm] to the d-line on the meridional image plane, and the line DS (solid line) represents the astigmatism [mm] to the g-line on the sagittal image plane.

FIGS. 2C, 3C, and 4C show the distortion. In these figures, the longitudinal axes represent the image height (Y') [mm]), and the solid lines represent the distortion [%] to the d-line.

[2. Example of Various Characteristics]

As described above, the magnification varying optical system OS has a plurality of lens units {at least four lens units (GR1 to GR4)} that direct light from the object side, to the image sensor SR. The optical power arrangement from the first lens unit GR1 to the fourth lens unit GR4 is "negative, positive, negative, positive."

Further, in this magnification varying optical system OS, in zooming from the wide-angle end to the telephoto end, at least the first lens unit GR1 is stationary, the distance from the first lens unit GR1 to the second lens unit GR2 is reduced, and the distance from the third lens unit GR3 to the fourth lens unit GR4 is increased.

Specifically, in the magnification varying optical system OS, the first lens unit GR1 and the fourth lens unit GR4 are stationary, and the second lens unit GR2 and the third lens unit GR3 are moved toward the object side, whereby zooming from the wide-angle end to the telephoto end is performed. Consequently, the distance from the first lens unit GR1 to the second lens unit GR2 is reduced, and the distance from the third lens unit GR3 to the fourth lens unit GR4 is increased.

In the magnification varying optical systems OS of the first and second examples, the distance (unit-to-unit distance) from the second lens unit GR2 and the third lens unit GR3 is reduced from the wide-angle condition to the middle focal length condition, and is increased from the middle focal length condition to the telephoto condition. However, since the distance at the telephoto end is larger than that at the wide-angle end, the distance from the second lens unit GR2 to the third lens unit GR3 can be expressed as being increased in zooming from the wide-angle end to the telephoto end.

In such a magnification varying optical system OS, the optical power arrangement is "negative, positive, negative, positive," and at the wide-angle end, the distance between the first lens unit GR1 and the second lens unit GR2 is largest during zooming. For this reason, the optical power arrangement of the first lens unit GR1 and the second lens unit GR2 may be called "retrofocus arrangement." In the case of such a retrofocus arrangement, a comparatively long back focal length is easily ensured.

However, the distance between the first lens unit GR1 and the second lens unit GR2 is reduced from the wide-angle end to the telephoto end. Then, the composite optical power of these lens units delivers positive optical power. That is, the negative optical power of the first lens unit GR1 is weakened. Consequently, the optical power arrangement of the composite positive optical power of the first lens unit GR1 and the second lens unit GR2 and the negative optical power of the third lens unit GR3 is "positive, negative," which can be called "telephoto arrangement." Such a telephoto arrangement can ensure a comparatively long focal length (long focus) without increasing the overall length of the magnification varying optical system OS. Consequently, the magnification varying optical system OS can ensure the long focus suitable for the telephoto end.

Moreover, since the first lens unit GR1 has negative optical power and the second lens unit GR2 has positive optical power, the directivity of the light exiting from the first lens unit GR1 and the directivity of the light exiting from the second lens unit GR2 are different from each other. For example, when light exits from the first lens unit GR1, the light exiting from below with respect to the optical axis AX has a directivity such that it moves away from the optical axis AX by negative optical power (diverging force). When such light exits from the second lens unit GR2, the light has a directivity such that it approaches the optical axis AX by positive optical power (converging force).

Then, the off-axial light exiting from the first lens unit GR1 (particularly, the off-axial light the height from the optical axis AX of which is comparatively large) changes its position at the optical axis AX when entering the third lens unit GR3 which is away from the first lens unit GR1. For example, the light situated below with respect to the optical axis AX when exiting from the first lens unit GR1 is situated above with respect to the optical axis AX when entering the third lens unit GR3.

That is, the off-axial light situated below with respect to the optical axis AX becomes off-axial light situated on the opposite side (that is, above) at the optical axis AX when entering the third lens unit GR3. Consequently, the direction of the distortion due to the first lens unit GR1 of negative optical power and the direction of the distortion due to the third lens unit GR3 of negative optical power are opposite to each other. Consequently, the distortion due to the first lens unit GR1 is canceled by the distortion due to the third lens unit GR3.

In particular, the comparatively longer the distance from the first lens unit GR1 to the third lens unit GR3 is, the larger the off-axial height (the height from the optical axis AX) of the off-axial light situated above the optical axis AX that the off-axial light situated below with respect to the optical axis AX when exiting from the first lens unit GR1 becomes when entering the third lens unit GR3. In such a case, it can be said that the distortion due to the third lens unit GR3 is apt to be caused by the off-axial light with a comparatively large off-axial height. Then, it can be said that in the case of the wide-angle end where the distance from the first lens unit to the third lens unit is longest, the cancellation of the distortion is most efficiently performed.

Moreover, the first lens unit GR1 has negative optical power, and includes the optical prism PR that changes the optical axis, for example, a rectangular prism. Consequently, the traveling direction of the light entering from the object side is bent substantially 90 degrees. Then, if the traveling direction of the light after the bending and the direction of the depth of the DSC 29 are substantially vertical to each other, the depth of the DSC 29 is reduced. For this reason, the magnification varying optical system OS having the first lens unit GR1 including such an optical prism PR is readily mounted on the DSC 29.

In the magnification varying optical systems OS of the first to fourth examples, not only the first lens unit GR1 has negative optical power but also the negative optical power is strong compared with that of the third lens unit GR3. For this reason, the spherical aberration due to the negative optical power of the first lens unit GR1 is apt to remarkably appear. Therefore, in the magnification varying optical system OS, the lens element that receives the exit light from the first lens unit GR1 first, that is, the most object side lens element of the second lens unit GR2 has positive optical power.

Specifically, such a lens element has positive optical power at least by having a convex surface on the object side. As described above, when the positive lens element having a convex surface on the object side is situated on the most object side of the second lens unit GR2, the light diverged by the negative optical power of the first lens unit GR1, particularly, the marginal light can be efficiently absorbed. Then, since the marginal light that is apt to cause spherical aberration is converged, the magnification varying optical system OS can efficiently correct spherical aberration.

A constant converging force is required to correct spherical aberration by the positive lens element having a convex surface on the object side. However, there are cases where a sufficient converging force cannot be obtained only by the convex surface on the object side. Measures to cope with these cases include compensating for the converging force by providing a convex surface or the like on the image side. When such a measure is taken, it is desirable that the convex surfaces on both sides be close to each other. This is because the marginal ray and the like can be converged at a position as close to the object side as possible and spherical aberration can be effectively corrected.

Then, it is desirable that the fourth lens element L4 (the-most object side lens element) of the second lens unit GR2 be a single lens like in the magnification varying optical systems OS of the first to fourth examples, because the convex surfaces on both sides can be easily made close to each other. Moreover, when the fourth lens element L4 is a single lens, the lens thickness can be made small compared with when a plurality of lenses (for example, a doublet lens) are disposed for the spherical aberration correction. For this reason, this arrangement is desirable also from the viewpoint of the size reduction of the magnification varying optical system OS.

Moreover, it is desirable that in the second lens unit GR2, a negative lens element (the fifth lens element L5) and a positive lens element (the sixth lens element L6) are situated on the image side of the fourth lens element L4. With this arrangement, since a combination of a negative lens element and a positive lens element is established, spherical aberration and coma aberration are effectively corrected.

In the first lens unit GR1, lens elements are situated in front of and behind (on the object side and the image side of) the optical prism PR. For example, a single lens (the first lens element L1 having negative optical power in the first to fourth examples) is situated on the object side of the optical prism PR. In such a case, it is desirable to suppress the distortion due to the first lens element L1 and reduce the diameter (front lens diameter) of the first lens element L1. Therefore, it is desirable that the magnification varying optical system OS satisfy the following condition A:

$$-2.0 < f\_GR1\_o/fm < -0.5 \qquad \text{condition A}$$

where f_GR1_o is the focal length [mm] of the lens element situated on the object side of the optical prism PR (the first lens element L1) in the first lens unit GR1;

fm is $(fw \times ft)^{1/2}$;

fw is the focal length [mm] of the whole (overall system) of the magnification varying optical system OS at the wide-angle end; and ft is the focal length [mm] of the whole (overall system) of the magnification varying optical system OS at the telephoto end.

The condition A defines the harmony (balance) between the suppression of the distortion due to the first lens element L1 and the size of the front lens diameter.

For example, when the value of (f_GR1_o/fm) is equal to or lower than the lower limit of the condition A since the focal length (focal length converted into an absolute value, |f_GR1_o|) of the first lens element L1 is long, the negative optical power of the first lens element L1 is comparatively weak. Consequently, distortion (negative distortion) is suppressed. However, the front lens diameter is apt to be large because the focal length is long.

On the other hand, for example, when the value of (f_GR1_o/fm) is equal to or higher than the upper limit of the condition A since the focal length (focal length converted into an absolute value) of the first lens element L1 is short, the negative optical power of the first lens element L1 is comparatively strong. Consequently, the front lens diameter is comparatively small. However, distortion is apt to be caused because the negative optical power is strong.

Therefore, when the focal length of the first lens element L1 and the focal length fm of the magnification varying optical system OS in the middle focal length condition are set so that the value of (f_GR1_o/fm) is within the range of the condition A, distortion is suppressed (corrected) while the front lens diameter is comparatively small.

Moreover, it is desirable that the magnification varying optical system OS satisfy the following condition B:

$$0.5 < f\_GR1\_o/f1 < 2.5 \qquad \text{condition B}$$

where f_GR1_o is the focal length [mm] of the lens element situated on the object side of the optical prism PR (the first lens element L1) in the first lens unit GR1; and f1 is the focal length [mm] of the first lens unit GR1.

The condition B is for making the balance between the suppression of distortion and the size of the front lens diameter more excellent from the ratio between the focal length f_GR1_o of the first lens element L1 and the focal length of the first lens unit GR1.

For example, when the value of (f_GR1_o/f1) is equal to or lower than the lower limit of the condition B since the focal length (focal length converted into an absolute value, |f_GR1_o|) of the first lens element L1 is short, the focal length on the object side of the reflecting surface of the optical prism PR is comparatively short. Consequently, the front lens diameter can be reduced. However, since the focal length is short, negative optical power is strong, and aberrations (particularly, negative distortion at the wide-angle end) are apt to be caused.

On the other hand, for example, when the value of (f_GR1_o/f1) is equal to or higher than the upper limit of the condition B since the focal length (focal length converted into an absolute value) of the first lens element L1 is long, the focal length on the object side of the reflecting surface of the optical prism PR is comparatively long. Consequently, the negative optical power of the first lens element L1 is comparatively weak, so that aberrations are suppressed. However, the front lens diameter is apt to increase because the focal length is long.

Therefore, when the focal length of the first lens element L1 and the focal length of the first lens unit GR1 are set so that the value of (f_GR1_o/f1) is within the range of the condition B, the front lens diameter is comparatively small while distortion is suppressed.

Moreover, it is desirable that the magnification varying optical system OS satisfy the following condition C:

$$-0.8 < f\_GR1\_o/f\_GR1\_i < 1.2 \qquad \text{condition C}$$

where f_GR1_o is the focal length [mm] of the lens element situated on the object side of the optical prism PR in the first lens unit GR1; and f_GR1_i is the focal length [mm] of the lens element situated on the image side of the optical prism PR in the first lens unit GR1.

The condition C is for making the balance between the suppression of distortion and the size of the front lens diameter still more excellent from the ratio between the focal length f_GR1_o of the first lens element L1 and the lens element situated on the image side of the optical prism PR (for example, the composite focal length of the second lens element L2 and the third lens element L3).

For example, when the value of (f_GR1_o/f_GR1_i) is equal to or lower than the lower limit of the condition C since the focal length (focal length converted into an absolute value, |f_GR1_o|) of the first lens element L1 is short, the focal length on the object side of the reflecting surface of the optical prism PR is comparatively short, so that the front lens diameter can be reduced. However, since the focal length is short, negative optical power is strong, and aberrations (particularly, negative distortion at the wide-angle end) are apt to be caused.

On the other hand, for example, when the value of (f_GR1_o/f_GR1_i) is equal to or higher than the upper limit of the condition C since the focal length (focal length converted into an absolute value) of the first lens element L1 is long, the focal length on the object side of the reflecting surface of the optical prism PR is comparatively long, so that the negative optical power of the first lens element L1 is comparatively weak, and aberrations are suppressed. However, the front lens diameter is apt to increase because the focal length is long.

Therefore, when the focal length of the first lens element L1 and the focal length of the lens element situated on the image side of the optical prism PR are set so that the value of (f_GR1_o/f_GR1_i) is within the range of the condition C, the front lens diameter is comparatively small while distortion is suppressed.

Moreover, it is desirable that the magnification varying optical system OS satisfy the following condition D to balance the suppression of aberrations and the overall length of the magnification varying optical system OS:

$$-1.3 < f1/fm < -0.5 \qquad \text{condition D}$$

where f1 is the focal length [mm] of the first lens unit GR1;
fm is $(fw \times fr)^{1/2}$;
fw is the focal length [mm] of the whole (overall system) of the magnification varying optical system OS at the wide-angle end; and
ft is the focal length [mm] of the whole (overall system) of the magnification varying optical system OS at the telephoto end.

The condition D defines the balance between the suppression of aberrations due to the first lens unit GR1 and the size of the front lens diameter (and consequently, the overall length of the magnification varying optical system OS).

For example, when the value of (f1/fm) is equal to or lower than the lower value of the condition D since the focal length (focal length converted into an absolute value, |f1|) of the first lens unit GR1 is long, the negative optical power of the first lens unit GR1 is comparatively weak. Consequently, aberrations are suppressed. However, the front lens diameter is large because the focal length is long, so that the overall length of the optical system is long.

On the other hand, for example, when the value of (f1/fm) is equal to or higher than the upper limit of the condition D since the focal length (focal length converted into an absolute value) of the first lens unit GR1, the negative optical power of the first lens unit GR1 is comparatively strong. Consequently, the front lens diameter is apt to be small and the overall length of the optical system is apt to be comparatively short. However, aberrations are apt to be caused because the negative optical power is strong. In particular, negative distortion is apt to be caused at the wide-angle end, or spherical aberration is apt to be caused at the telephoto end.

Therefore, when the focal length of the first lens unit GR1 and the focal length of the magnification varying optical system OS in the middle focal length condition are set so that the value of (f1/fm) is within the range of the condition D, aberrations are suppressed while the front lens diameter is comparatively small (consequently, the overall length of the optical system is reduced).

The suppression of aberrations and the overall length of the magnification varying optical system OS can also be balanced by appropriately setting the focal length of the second lens unit GR2. For example, it is desirable that the magnification varying optical system satisfy the following condition E:

$$0.5 < f2/fm < 1.5 \qquad \text{condition E}$$

where f2 is the focal length [mm] of the second lens unit GR2;
fm is $(fw \times ft)^{1/2}$;
fw is the focal length [mm] of the whole (overall system) of the magnification varying optical system OS at the wide-angle end; and
ft is the focal length [mm] of the whole (overall system) of the magnification varying optical system OS at the telephoto end.

The condition E defines the balance between the suppression of aberrations due to the second lens unit GR2 and the overall length of the magnification varying optical system OS.

For example, when the value of (f2/fm) is equal to or lower than the lower limit of the condition E since the focal length of the second lens unit GR2 is short, the positive optical power of the second lens unit GR2 is comparatively strong. Consequently, the overall length of the optical system is comparatively short. However, aberrations are apt to be caused because the positive optical power is strong. In particular, spherical aberration and coma aberration are apt to be caused.

On the other hand, for example, when the value of (f2/fm) is equal to or higher than the upper limit of the condition E since the focal length of the second lens unit GR2 is long, the positive optical power of the second lens unit GR2 is comparatively weak. Consequently, aberrations are suppressed. However, the overall length of the optical system is long because the focal length is long.

Therefore, when the focal length of the second lens unit GR2 and the focal length of the magnification varying optical system OS in the middle focal length condition are set so that the value of (f2/fm) is within the range of the condition E, the overall length of the magnification varying optical system OS is reduced while aberrations are suppressed.

Moreover, the suppression of aberrations and the overall length of the magnification varying optical system OS can also be balanced by appropriately setting the focal length of the third lens unit GR3. For example, it is desirable that the magnification varying optical system satisfy the following condition F:

$$-1.1 < f3/fm < -0.2 \quad \text{condition F}$$

where f3 is the focal length [mm] of the third lens unit GR3;
fm is $(fw \times ft)^{1/2}$;
fw is the focal length [mm] of the whole (overall system) of the magnification varying optical system OS at the wide-angle end; and
ft is the focal length [mm] of the whole (overall system) of the magnification varying optical system OS at the telephoto end.

For example, when the value of (f3/fm) is equal to or lower than the lower limit of the condition F since the focal length (focal length converted into an absolute value, |f3|) of the third lens unit GR3 is long, the negative optical power of the third lens unit GR3 is comparatively weak. Consequently, aberrations due to the third lens unit GR3 are suppressed. However, since the negative optical power is weak, it is necessary that the movement amount of the third lens unit GR3 in focusing be comparatively large, so that the overall length of the magnification varying optical system OS is apt to be increased.

On the other hand, for example, when the value of (f3/fm) is equal to or higher than the upper limit of the condition F since the focal length (focal length converted into an absolute value) of the third lens unit GR3 is short, the negative optical power of the third lens unit GR3 is comparatively strong. Consequently, the movement amount of the third lens unit GR3 in focusing is comparatively small. However, aberrations are apt to be caused because the negative optical power is strong. In particular, negative distortion is apt to be caused at the wide-angle end.

Therefore, when the focal length of the third lens unit GR3 and the focal length of the magnification varying optical system OS in the middle focal length condition are set so that the value of (f3/fm) is within the condition F, aberrations are suppressed while the overall length of the magnification varying optical system OS is suppressed.

It is desirable that the most object side positive lens element (the fourth lens element L4) in the second lens unit GR2 satisfy the following condition G in correcting spherical aberration:

$$-1.2 < [r\_GR2\_o + r\_GR2\_i]/[r\_GR2\_o - r\_GR2\_i] < 0 \quad \text{condition G}$$

where r_GR2_o is the radius of curvature [mm] of the object side surface of the most object side positive lens element in the second lens unit GR2; and
r_GR2_i is the radius of curvature [mm] of the image side surface of the most object side positive lens element in the second lens unit GR2.

The condition G defines the configuration of the most object side positive lens element. Specifically, the condition G defines the condition for making the optical power of the object side surface stronger than that of the image side surface.

For example, when the value of [r_GR2_o+r_GR2_i]/[r_GR2_o−r_GR2_i] is equal to or lower than the lower limit of the condition G since the absolute value of the radius of curvature of the object side surface is lower than the absolute value of the radius of curvature of the image side surface, the positive optical power of the object side surface is strong because the radius of curvature is reduced (curvature is too strong). When the positive optical power is too strong like this, spherical aberration that is rather undercorrected is caused.

On the other hand, for example, when the value of [r_GR2_o+r_GR2_i]/[r_GR2_o−r_GR2_i] is equal to or higher than the upper limit of the condition G since the absolute value of the radius of curvature of the object side surface is higher than the absolute value of the radius of curvature of the image side surface, the positive optical power of the object side surface is weakened because the radius of curvature is increased (curvature is too weak). When the positive optical power is too weak like this, spherical aberration that is rather overcorrected is caused.

Therefore, when the radius of curvature (r_GR2_o) of the object side surface and the radius of curvature (r_GR2_i) of the image side surface are set so that the value of [r_GR2_o+r_GR2_i]/[r_GR2_o−r_GR2_i] is within the range of the condition G, the generation of the spherical aberration that is rather undercorrected or overcorrected is suppressed.

Since that the value of [r_GR2_o+r_GR2_i]/[r_GR2_o−r_GR2_i] is lower than 0 (zero) means that the radius of curvature of the object side surface is shorter than that of the image side surface, it can be said that the optical power of the object side surface is always stronger than that of the image side surface.

Moreover, it is desirable that at least one of the object side surface and the image side surface of the most object side positive lens element (the fourth lens element L4) in the second lens unit GR2 be aspherical. This is because when an aspherical surface is present like this, aberrations can be effectively corrected. In the first to fourth examples, both surfaces of the fourth lens element L4 are aspherical.

Further, it is desirable that at least one of the aspherical surfaces of the most object side positive lens element (the fourth lens element L4) in the second lens unit GR2 satisfy the following condition H:

$$-0.01 < [X\_GR2\_o - X0\_GR2\_o]/[(N'\_GR2\_o - N\_GR2\_o) \times f2] < 0 \quad \text{condition H}$$

where in the aspherical surface included in the most object side positive lens element in the second lens unit GR2,
X_GR2_o is the amount of displacement [mm] in the direction of the optical axis at a height 0.7 times the effective diameter from the optical axis of the aspherical surface in a vertical direction (here, the value of the displacement amount on the object side is negative, and the value of the displacement amount on the image side is positive);
X0_GR2_o is the amount of displacement [mm] in the direction of the optical axis at a height 0.7 times the effective diameter from the optical axis of the reference spherical surface of the aspherical surface in the vertical direction (here, the value of the displacement amount on the object side is negative, and the value of the displacement amount on the image side is positive);

N_GR2_o is the refractive index to the d-line of the object side medium with respect to the aspherical surface;

N'_GR2_o is the refractive index to the d-line of the image side medium with respect to the aspherical surface; and f2 is the focal length [mm] of the second lens unit.

The condition H defines the aspherical surface configuration required for the adjustment of the positive optical power of the fourth lens element L4 (positive lens element) of the second lens unit GR2. Specifically, by setting the negative optical power due to the aspherical surface, the positive optical power of the most object side positive lens element is appropriately weakened.

This is because the sign of the value of (N'_GR2_o−N_GR2_o) is positive, for example, when the object side of the aspherical surface is air and the image side thereof is the medium. Since the second lens unit GR2 has positive optical power, the sign of f2 is positive. Consequently, the sign of the value of (X_GR2_o−X0_GR2_o) is negative. As described above, when the value of (X_GR2_o−X0_GR2_o) is negative, the object side aspherical surface of the positive lens element has a displacement amount with respect to the object side. Consequently, the object side aspherical surface delivers negative optical power.

Moreover, the sign of the value of (N'_GR2_o−N_GR2_o) is negative, for example, when the object side of the aspherical surface is the medium and the image side thereof is air. Consequently, the sign of the value of (X_GR2_o−X0_GR2_o) is positive. As described above, when the value of (X_GR2_o−X0_GR2_o) is positive, the image side aspherical surface of the positive lens element has a displacement amount with respect to the image side. Consequently, the image side aspherical surface delivers negative optical power.

Then, it can be said that the absolute value of [X_GR2_o−X0_GR2_o]/[(N'_GR2_o−N_GR2_o)×f2] reflects negative optical power. Consequently, when the value of [X_GR2_o−X0_GR2_o]/[(N'_GR2_o−N_GR2_o)×f2] is equal to or lower than the lower limit of the condition H, the negative optical power of the aspherical surface is excessively strong, and the positive optical power of the positive lens element is excessively weak. Consequently, spherical aberration that is rather overcorrected is caused.

On the other hand, when the value of [X_GR2_o−X0_GR2_o]/[(N'_GR2_o−N_GR2_o)×f2] is equal to or higher than the upper limit of the condition H, the negative optical power of the aspherical surface is excessively weak, and the positive optical power of the positive lens element is excessively strong. Consequently, spherical aberration that is rather undercorrected is caused.

Therefore, when X_GR2_o, X0_GR2_o, N_GR2_o, N'_GR2_o, and f2 are set so that the value of [X_GR2_o−X0_GR2_o]/[(N'_GR2_o−N_GR2_o)×f2] is within the range of the condition H, the generation of the spherical aberration that is rather overcorrected or undercorrected is suppressed.

However, even when both surfaces of the fourth lens element L4 in the second lens unit GR2 are aspherical, it is unnecessary that both surfaces always satisfy the condition H. For example, when negative optical power is shared between the aspherical surfaces to weaken the positive optical power of the fourth lens element L4 (the first, second, and fourth examples), it is desirable that the aspherical surfaces satisfy the condition H.

However, in the correction of the spherical aberration, there are cases (the third example) where not by causing the aspherical surfaces to share the negative optical power but by causing them to generate spherical aberrations having different characteristics, the spherical aberrations are canceled each other out. In such cases, it is unnecessary that both aspherical surfaces have negative optical power, and it is desirable that both aspherical surfaces have opposite optical powers.

For this reason, as shown in Table 9 described later, in the cases of the first, second, and fourth examples, both surfaces of the fourth lens element L4 satisfy the condition H, whereas in the case of the third example, only one surface of the fourth lens element L4 satisfies the condition H.

The third lens unit GR3 includes one lens element (the seventh lens element L7). This is because with this, not only the overall length of the magnification varying optical system OS can be reduced but also the weight of the third lens unit GR3 is reduced.

In addition, the third lens unit GR3 bears the load of focusing. Then, the thrust for moving the comparatively lightweight third lens unit GR3 (for example, the thrust of an actuator) is small. Consequently, this leads not only to the suppression of power consumption of the actuator or the like but also to the size reduction of the actuator or the like, consequently, the size reduction of the DSC 29.

It is desirable that the third lens unit GR3 (substantially a single lens, the seventh lens element L7) satisfy the following condition I:

$$-0.8 < [r\_GR3\_0 + r\_GR3\_i]/[r\_GR3\_0 - r\_GR3\_i] < 1.6 \quad \text{condition I}$$

where r_GR3_0 is the radius of curvature [mm] of the object side surface of the single lens constituting the third lens unit GR3; and r_GR3_i is the radius of curvature [mm] of the image side surface of the single lens constituting the third lens unit GR3.

The condition I defines the configuration of the single lens in the third lens unit GR3. Specifically, the condition I defines the balance between the optical power of the object side surface of the single lens and the optical power of the image side surface thereof.

For example, when the value of [r_GR3_0+r_GR3_i]/[r_GR3_0−r_GR3_i] is equal to or lower than the lower limit of the condition I, the radius of curvature of the object side surface of the single lens is shorter than the radius of curvature of the image side surface thereof. Consequently, the optical power of the object side surface is excessively strong, and aberrations are caused. In particular, spherical aberration at the telephoto end is apt to be caused.

On the other hand, when the value of [r_GR3_0+r_GR3_i]/[r_GR3_0−r_GR3_i] is equal to or higher than the upper limit of the condition I, the radius of curvature of the image side surface of the single lens is shorter than the radius of curvature of the object side surface thereof. Consequently, the optical power of the image side surface is excessively strong, and aberrations are caused (in particular, distortion and coma aberration at the wide-angle end are apt to be caused).

Therefore, when the radius of curvature r_GR3_0 of the object side surface and the radius of curvature r_GR3_i of the image side surface are set so that the value of [r_GR3_0+r_GR3_i]/[r_GR3_0−r_GR3_i] is within the range of the condition I.

Moreover, it is desirable that at least one of the object side surface and the image side surface of the single lens in the third lens unit GR3 be aspherical. This is because when an aspherical surface is present like this, aberrations can be effectively corrected. In the first to fourth examples, both surfaces of the seventh lens element L7 are aspherical.

Further, it is desirable that at least one of the aspherical surfaces of the single lens (the seventh lens element L7) in the third lens unit GR3 satisfy the following condition J:

$$0 < [X\_GR3 - X0\_GR3]/[(N'\_GR3 - N\_GR3) \times f3] < 0.015 \quad \text{condition J}$$

where in the aspherical surface included in the single lens in the third lens unit GR3, X_GR3 is the amount of displacement [mm] in the direction of the optical axis at a height 0.7 times the effective diameter from the optical axis of the aspherical surface in a vertical direction (here, the value of the displacement amount on the object side is negative, and the value of the displacement amount on the image side is positive);

X0_GR3 is the amount of displacement [mm] in the direction of the optical axis at a height 0.7 times the effective diameter from the optical axis of the reference spherical surface of the aspherical surface in the vertical direction (here, the value of the displacement amount on the object side is negative, and the value of the displacement amount on the image side is positive);

N_GR3 is the refractive index to the d-line of the object side medium with respect to the aspherical surface;

N'_GR3 is the refractive index to the d-line of the image side medium with respect to the aspherical surface; and f3 is the focal length [mm] of the third lens unit.

The condition J defines the aspherical surface configuration required for the adjustment of the negative optical power of the seventh lens element L7 (single lens) of the third lens unit GR3. Specifically, by setting the negative optical power due to the aspherical surface, the negative optical power of the most object side single lens is appropriately increased.

This is because the sign of the value of (N'_GR3−N_GR3) is positive, for example, when the object side of the aspherical surface is air and the image side thereof is the medium. Since the third lens unit GR3 has negative optical power, the sign of f3 is negative. Consequently, the sign of the value of (X_GR3−X0_GR3) is negative. As described above, when the value of (X_GR3−X0_GR3) is negative, the object side aspherical surface of the single lens has a displacement amount with respect to the object side. Consequently, the object side aspherical surface delivers negative optical power.

Moreover, the sign of the value of (N'_GR3−N_GR3) is negative, for example, when the object side of the aspherical surface is the medium and the image side thereof is air. Consequently, the sign of the value of (X_GR3−X0_GR3) is positive. As described above, when the value of (X_GR3−X0_GR3) is positive, the image side aspherical surface of the single lens has a displacement amount with respect to the image side. Consequently, the image side aspherical surface delivers negative optical power.

Then, it can be said that the value of [X_GR3−X0_GR3]/[(N'_GR3−N_GR3)×f3] reflects negative optical power. Consequently, when the value of [X_GR3−X0_GR3]/[(N'_GR3−N_GR3)×f3] is equal to or lower than the lower limit of the condition J, the negative optical power of the aspherical surface is excessively strong, and the negative optical power of the single lens is excessively strong. Consequently, aberrations, particularly, curvature of field is caused at the wide-angle end.

On the other hand, when the value of [X_GR3−X0_GR3]/[(N'_GR3−N_GR3)×f3] is equal to or higher than the upper limit of the condition J, the negative optical power of the aspherical surface does not increase, so that the negative optical power of the single lens is comparatively insufficient. Consequently, the power to bend the off-axial light upward, for example, for the correction of spherical aberration is insufficient, so that the correction of such spherical aberration is insufficient. In particular, in the case of the telephoto end, spherical aberration is remarkable.

Therefore, when the X_GR3, X0_GR3, N'_GR3, N_GR3, and f3 are set so that the value of [X_GR3−X0_GR3]/[(N'_GR3−N_GR3)×f3] is within the range of the condition J, the generation of aberrations such as curvature of field and spherical aberration are suppressed.

However, even when both surfaces of the seventh lens element L7 in the third lens unit GR3 are aspherical, it is unnecessary that both surfaces satisfy the condition J. For example, when negative optical power is shared between the aspherical surfaces to increase the negative optical power of the seventh lens element L7 (the third example), it is desirable that the aspherical surfaces satisfy the condition J.

However, in the correction of aberrations, there are cases where not by causing the aspherical surfaces to share the negative optical power but by causing them to generate aberrations having different characteristics, the aberrations are canceled each other out (the first, second, and fourth examples). In such cases, it is unnecessary that both aspherical surfaces have negative optical power, and it is desirable that aspherical surfaces have opposite optical powers.

For this reason, as shown in Table 9 described later, in the case of the third example, both surfaces of the seventh lens element L7 satisfy the condition J, whereas in the cases of the first, second, and fourth examples, only one surface of the seventh lens element L7 satisfies the condition J.

As described above, it is desirable that the magnification varying optical system OS satisfy various conditions. Therefore, results of the conditions corresponding to the magnification varying optical systems OS of the first to fourth examples are shown in the following Table 9:

TABLE 9

| CONDITION | | EXAMPLE 1 | EXAMPLE 2 | EXAMPLE 3 | EXAMPLE 4 |
|---|---|---|---|---|---|
| A | | −0.95 | −0.93 | −1.68 | −1.28 |
| B | | 1.05 | 1.01 | 2.21 | 1.66 |
| C | | 0.01 | −0.02 | 0.90 | 0.41 |
| D | | −0.91 | −0.92 | −0.76 | −0.77 |
| E | | 0.81 | 0.81 | 0.78 | 0.70 |
| F | | −0.88 | −0.85 | −0.71 | −0.60 |
| G | | −0.83 | −0.56 | −0.49 | −0.41 |
| H | OBJECT SIDE | −0.0020 | −0.0018 | 0.0004 | −0.0020 |
| | IMAGE SIDE | −0.0006 | −0.0011 | −0.0036 | −0.0065 |

TABLE 9-continued

| | CONDITION | EXAMPLE 1 | EXAMPLE 2 | EXAMPLE 3 | EXAMPLE 4 |
|---|---|---|---|---|---|
| | I | 0.07 | −0.36 | 1.29 | 0.80 |
| J | OBJECT SIDE | 0.0013 | −0.0041 | 0.0006 | −0.0014 |
| | IMAGE SIDE | −0.0002 | 0.0070 | 0.0004 | 0.0031 |

Other Embodiments

The present invention is not limited to the above-described embodiment, and various modifications are possible without departing from the scope of the invention.

For example, the image taking apparatus is an optical apparatus optically capturing an image of the subject and outputting it as an electric signal, and is a principal component of cameras used for taking still images and moving images of the subject. Examples of such cameras include digital still cameras, video cameras, surveillance cameras, vehicle-mounted cameras, cameras for videophones, and cameras for doorphones. Examples also include cameras incorporated in or externally attached to personal computers, mobile information apparatuses (compact and portable information apparatus terminals such as mobile computers, mobile telephones, and personal digital assistants (PDAs)), peripherals (mice, scanners, printers, memories, etc.) thereof, other digital apparatuses and the like.

As is apparent from these examples, not only a camera can be constructed by use of the image taking apparatus but also a camera function can be added by providing various apparatuses with the image forming apparatus. For example, a digital apparatus having an image input function such as a camera phone can be constructed.

While the term "digital still camera" conventionally denotes cameras that record only optical still images, digital still cameras and home digital movie cameras that are capable of handling both still images and moving images have also been proposed and presently, these cameras are not specifically distinguished from each other. Therefore, the term "digital still camera" includes all of the cameras such as digital still cameras, digital movie cameras, and web cameras (cameras connected to apparatuses that enable image transmission and reception by being connected to a network irrespective of whether it is an open type or a private type; including both of cameras directly connected to the network and cameras connected through an apparatus having an information processing function such as a personal computer) whose principal component is an image taking apparatus including a taking lens system that forms an optical image and an image sensor that converts the optical image into an electric video signal.

Moreover, the magnification varying optical system OS is used for various image taking apparatuses and digital input apparatuses (for example, digital apparatuses having an image taking apparatus). Therefore, the image taking apparatuses and the like using such a magnification varying optical system OS are compact. In addition, the proportion of the magnification varying optical system OS in the limited space inside the casing (inside the housing) of the image taking apparatus or the like is comparatively small. For this reason, various parts such as electronic parts can be disposed in a sufficient space in the housing of the image taking apparatus or the like, and the effective use of the housing volume can be achieved. Consequently, a high-performance image taking apparatus having various parts can be realized.

According to the above-described embodiment, by adjusting the setting of the power arrangement and the setting of the distances between the lens units, a comparatively long back focal length is secured while the overall length of the magnification varying optical system is short. A comparatively long focal length is also ensured. In addition, since the first lens unit has the optical prism that changes the optical axis, the magnification varying optical system is prevented from being elongated in one direction, so that the magnification varying optical system is readily mounted on the image taking apparatus.

Since a positive lens element having a convex surface on the object side is disposed in the most object side position in the second lens unit, the light diverged by the negative optical power of the first lens unit (off-axial light or the like) is efficiently converged. Consequently, the magnification varying optical system effectively corrects spherical aberration and the like. In addition, in the second lens unit, a combination of a negative lens element and a positive lens element is established by disposing a negative lens element and a positive lens element in positions other than on the most object side. Consequently, the magnification varying optical system effectively corrects chromatic aberration and coma aberration.

Thus, it can be said that the magnification varying optical system of the above-described embodiment sufficiently satisfies the requirements, size reduction and performance enhancement.

What is claimed is:

1. A magnification varying optical system that directs light from an object to an image sensor, comprising from the object side to an image side:
   a first lens unit having negative optical power, and including an optical axis changing element that changes an optical axis;
   a second lens unit having positive optical power, and including three lens elements, the second lens unit having:
      a positive lens element having a convex surface on the object side, in a most object side position;
      a negative lens element; and
      a positive lens element;
   a third lens unit having negative optical power; and
   a fourth lens unit having positive optical power,
   wherein in magnification varying from a wide-angle end to a telephoto end,
   the first lens unit is stationary,
   a distance from the first lens unit to the second lens unit decreases, a distance from the third lens unit to the fourth lens unit increases, and the magnification varying optical system satisfies the following conditions:

$$-2.0 < f\_GR1\_o/fm < -0.5, \text{ and}$$

$$-1.2 < [r\_GR2\_o + r\_GR2\_i]/[r\_GR2\_o - r\_GR2\_i] < 0$$

where f_GR1_o is a focal length of a lens element situated on the object side of the optical axis changing element in the first lens unit;
fm is $(fw \times ft)^{1/2}$;
fw is an overall focal length of the magnification varying optical system at the wide-angle end;
ft is an overall focal length of the magnification varying optical system at the telephoto end;
r_GR2_o is a radius of curvature of an object side surface of the most object side positive lens element in the second lens unit; and
r_GR2_i is a radius of curvature of an image side surface of the most object side positive lens element in the second lens unit,
wherein the magnification varying optical system further satisfies the following conditions:

$$-1.3 < f1/fm < -0.5, \text{ and}$$

$$0.5 < f2/fm < 1.5,$$

where f1 is a focal length of the first lens unit, and
f2 is a focal length of the second lens unit.

2. A magnification varying optical system that directs light from an object to an image sensor, comprising from the object side to an image side:
 a first lens unit having negative optical power, and including an optical axis changing element that changes an optical axis;
 a second lens unit having positive optical power, and including three lens elements, the second lens unit having:
  a positive lens element having a convex surface on the object side, in a most object side position;
  a negative lens element; and
  a positive lens element;
 a third lens unit having negative optical power; and
 a fourth lens unit having positive optical power,
 wherein in magnification varying from a wide-angle end to a telephoto end,
 the first lens unit is stationary,
 a distance from the first lens unit to the second lens unit decreases, a distance from the third lens unit to the fourth lens unit increases, and
 the magnification varying optical system satisfies the following conditions:

$$-2.0 < f\_GR1\_o/fm < -0.5, \text{ and}$$

$$-1.2 < [r\_GR2\_o + r\_GR2\_i]/[r\_GR2\_o - r\_GR2\_i] < 0$$

where f_GR1_o is a focal length of a lens element situated on the object side of the optical axis changing element in the first lens unit;
fm is $(fw \times ft)^{1/2}$;
fw is an overall focal length of the magnification varying optical system at the wide-angle end;
ft is an overall focal length of the magnification varying optical system at the telephoto end;
r_GR2_o is a radius of curvature of an object side surface of the most object side positive lens element in the second lens unit; and
r_GR2_i is a radius of curvature of an image side surface of the most object side positive lens element in the second lens unit,
wherein the positive lens element in the most object side of the second lens unit has an aspherical surface.

3. A magnification varying optical system of claim 2, wherein the aspherical surface of the second lens unit satisfies the following condition:

$$-0.01 < [X\_GR2\_o - X0\_GR2\_o]/[(N'\_GR2\_o - N\_GR2\_o) \times f2] < 0$$

where in the aspherical surface included in the most object side positive lens element of the second lens unit,
X_GR2_o is an amount of displacement [mm] in a direction of an optical axis at a height 0.7 times an effective diameter from the optical axis of the aspherical surface in a vertical direction (here, the value of the displacement amount on the object side is negative, and the value of the displacement amount on the image side is positive);
X0_GR2_o is an amount of displacement [mm] in a direction of the optical axis at a height 0.7 times an effective diameter from the optical axis of a reference spherical surface of the aspherical surface in a vertical direction (here, the value of the displacement amount on the object side is negative, and the value of the displacement amount on the image side is positive);
N_GR2_o is a refractive index to d-line of an object side medium with respect to the aspherical surface;
N'_GR2_o is a refractive index to d-line of an image side medium with respect to the aspherical surface; and
f2 is the focal length [mm] of the second lens unit.

4. A magnification varying optical system of claim 2, wherein the third lens unit has one lens element and the following condition is satisfied, $$-0.8 < [r\_GR3\_0 + r\_GR3\_i]/[r\_GR3\_0 - r\_GR3\_i] < 1.6$$

where r_GR3_0 is a radius of curvature [mm] of an object side surface of the single lens element constituting the third lens unit; and
r_GR3_i is a radius of curvature [mm] of the image side surface of the single lens element constituting the third lens unit.

5. A magnification varying optical system of claim 4, wherein the lens element of the third lens unit has an aspherical surface.

6. A magnification varying optical system of claim 5, wherein the aspherical surface of the third lens unit satisfies the following condition, $$0 < [X\_GR3 - X0\_GR3]/[(N'\_GR3 - N\_GR3) \times f3] < 0.015$$

where in the aspherical surface included in the single lens element of the third lens unit,
X_GR3 is an amount of displacement [mm] in a direction of an optical axis at a height 0.7 times an effective diameter from the optical axis of the aspherical surface in a vertical direction (here, the value of the displacement amount on the object side is negative, and the value of the displacement amount on the image side is positive);
X0_GR3 is an amount of displacement [mm] in a direction of an optical axis at a height 0.7 times an effective diameter from the optical axis of a reference spherical surface of the aspherical surface in a vertical direction (here, the value of the displacement amount on the object side is negative, and the value of the displacement amount on the image side is positive);

N_GR3 is a refractive index to d-line of an object side medium with respect to the aspherical surface;

N'_GR3 is a refractive index to d-line of an image side medium with respect to the aspherical surface; and f3 is a focal length [mm] of the third lens unit.

7. A magnification varying optical system that directs light from an object to an image sensor, comprising from the object side to an image side:
- a first lens unit having negative optical power, and including an optical axis changing element that changes an optical axis;
- a second lens unit having positive optical power, and including three lens elements, the second lens unit having:
  - a positive lens element having a convex surface on the object side, in a most object side position;
  - a negative lens element; and
  - a positive lens element;
- a third lens unit having negative optical power; and
- a fourth lens unit having positive optical power,
wherein in magnification varying from a wide-angle end to a telephoto end,
the first lens unit is stationary,
a distance from the first lens unit to the second lens unit decreases, a distance from the third lens unit to the fourth lens unit increases, and
the magnification varying optical system satisfies the following conditions:

$$-2.0 < f\_GR1\_o/fm < -0.5, \text{ and}$$

$$-1.2 < [r\_GR2\_o + r\_GR2\_i]/[r\_GR2\_o - r\_GR2\_i] < 0$$

where f_GR1_o is a focal length of a lens element situated on the object side of the optical axis changing element in the first lens unit;

fm is $(fw \times ft)^{1/2}$;

fw is an overall focal length of the magnification varying optical system at the wide-angle end;

ft is an overall focal length of the magnification varying optical system at the telephoto end;

r_GR2_o is a radius of curvature of an object side surface of the most object side positive lens element in the second lens unit; and r_GR2_i is a radius of curvature of an image side surface of the most object side positive lens element in the second lens unit, wherein focusing is performed by movement of the third lens unit.

8. An image taking apparatus comprising:
an image sensor that converts an optical image into an electric signal, and
a magnification varying optical system that forming the optical image of an object, the magnification varying optical system comprising from the object side to an image side:
- a first lens unit having negative optical power, and including an optical axis changing element that changes an optical axis;
- a second lens unit having positive optical power, and including three lens elements, the second lens unit having:
  - a positive lens element having a convex surface on the object side, in a most object side position;
  - a negative lens element; and
  - a positive lens element;
- a third lens unit having negative optical power; and
- a fourth lens unit having positive optical power,
wherein in magnification varying from a wide-angle end to a telephoto end,
the first lens unit is stationary,
a distance from the first lens unit to the second lens unit decreases, a distance from the third lens unit to the fourth lens unit increases, and
the magnification varying optical system satisfies the following conditions:

$$-2.0 < f\_GR1\_o/fm < -0.5, \text{ and}$$

$$-1.2 < [r\_GR2\_o + r\_GR2\_i]/[r\_GR2\_o - r\_GR2\_i] < 0$$

where f_GR1_o is a focal length of a lens element situated on the object side of the optical axis changing element in the first lens unit;

fm is $(fw \times ft)^{1/2}$;

fw is an overall focal length of the magnification varying optical system at the wide-angle end;

ft is an overall focal length of the magnification varying optical system at the telephoto end;

r_GR2_o is a radius of curvature of an object side surface of the most object side positive lens element in the second lens unit; and r_GR2_i is a radius of curvature of an image side surface of the most object side positive lens element in the second lens unit, wherein the magnification varying optical system further satisfies the following conditions:

$$-1.3 < f1/fm < -0.5, \text{ and}$$

$$0.5 < f2/fm < 1.5,$$

where f1 is a focal length of the first lens unit, and f2 is a focal length of the second lens unit.

9. An image taking apparatus comprising:
an image sensor that converts an optical image into an electric signal, and
a magnification varying optical system that forming the optical image of an object, the magnification varying optical system comprising from the object side to an image side:
- a first lens unit having negative optical power, and including an optical axis changing element that changes an optical axis;
- a second lens unit having positive optical power, and including three lens elements, the second lens unit having:
  - a positive lens element having a convex surface on the object side, in a most object side position;
  - a negative lens element; and
  - a positive lens element;
- a third lens unit having negative optical power; and
- a fourth lens unit having positive optical power,
wherein in magnification varying from a wide-angle end to a telephoto end,
the first lens unit is stationary,
a distance from the first lens unit to the second lens unit decreases, a distance from the third lens unit to the fourth lens unit increases, and the magnification varying optical system satisfies the following conditions:

$-2.0 < f\_GR1\_o/fm < -0.5$, and $-1.2 < [r\_GR2\_o + r\_GR2\_i]/[r\_GR2\_o - r\_GR2\_i] < 0$ where f_GR1_o is a focal length of a lens element situated on the object side of the optical axis changing element in the first lens unit;

fm is $(fw \times ft)^{1/2}$;

fw is an overall focal length of the magnification varying optical system at the wide-angle end;

ft is an overall focal length of the magnification varying optical system at the telephoto end;

r_GR2_o is a radius of curvature of an object side surface of the most object side positive lens element in the second lens unit; and r_GR2_i is a radius of curvature of an image side surface of the most object side positive lens element in the second lens unit, wherein the positive lens element in the most object side of the second lens unit has an aspherical surface.

10. A image taking apparatus of claim 9, wherein the aspherical surface of the second lens unit satisfies the following condition:

$-0.01 < [X\_GR2\_o - X0\_GR2\_o]/[(N'\_GR2\_o - N\_GR2\_o) \times f2] < 0$ where in the aspherical surface included in the most object side positive lens element of the second lens unit, X_GR2_o is an amount of displacement [mm] in a direction of an optical axis at a height 0.7 times an effective diameter from the optical axis of the aspherical surface in a vertical direction (here, the value of the displacement amount on the object side is negative, and the value of the displacement amount on the image side is positive);

X0_GR2_o is an amount of displacement [mm] in a direction of the optical axis at a height 0.7 times an effective diameter from the optical axis of a reference spherical surface of the aspherical surface in a vertical direction (here, the value of the displacement amount on the object side is negative, and the value of the displacement amount on the image side is positive);

N_GR2_o is a refractive index to d-line of an object side medium with respect to the aspherical surface;

N'_GR2_o is a refractive index to d-line of an image side medium with respect to the aspherical surface; and f2 is the focal length [mm] of the second lens unit.

11. A image taking apparatus of claim 9, wherein the third lens unit has one lens element and the following condition is satisfied, $-0.8 < [r\_GR3\_0 + r\_GR3\_i]/[r\_GR3\_0 - r\_GR3\_i] < 1.6$ where r_GR3_0 is a radius of curvature [mm] of an object side surface of the single lens element constituting the third lens unit; and r_GR3_i is a radius of curvature [mm] of the image side surface of the single lens element constituting the third lens unit.

12. A image taking apparatus of claim 11, wherein the lens element of the third lens unit has an aspherical surface.

13. A image taking apparatus of claim 12, wherein the aspherical surface of the third lens unit satisfies the following condition, $0 < [X\_GR3 - X0\_GR3]/[(N'\_GR3 - N\_GR3) \times f3] < 0.015$ where in the aspherical surface included in the single lens element of the third lens unit, X_GR3 is an amount of displacement [mm] in a direction of an optical axis at a height 0.7 times an effective diameter from the optical axis of the aspherical surface in a vertical direction (here, the value of the displacement amount on the object side is negative, and the value of the displacement amount on the image side is positive);

X0_GR3 is an amount of displacement [mm] in a direction of an optical axis at a height 0.7 times an effective diameter from the optical axis of a reference spherical surface of the aspherical surface in a vertical direction (here, the value of the displacement amount on the object side is negative, and the value of the displacement amount on the image side is positive);

N_GR3 is a refractive index to d-line of an object side medium with respect to the aspherical surface;

N'_GR3 is a refractive index to d-line of an image side medium with respect to the aspherical surface; and f3 is a focal length [mm] of the third lens unit.

14. An image taking apparatus comprising:

an image sensor that converts an optical image into an electric signal, and a magnification varying optical system that forming the optical image of an object, the magnification varying optical system comprising from the object side to an image side:

a first lens unit having negative optical power, and including an optical axis changing element that changes an optical axis;

a second lens unit having positive optical power, and including three lens elements, the second lens unit having:

a positive lens element having a convex surface on the object side, in a most object side position;

a negative lens element; and a positive lens element;

a third lens unit having negative optical power; and a fourth lens unit having positive optical power, wherein in magnification varying from a wide-angle end to a telephoto end, the first lens unit is stationary, a distance from the first lens unit to the second lens unit decreases, a distance from the third lens unit to the fourth lens unit increases, and the magnification varying optical system satisfies the following conditions:

$-2.0 < f\_GR1\_o/fm < -0.5$, and $-1.2 < [r\_GR2\_o + r\_GR2\_i]/[r\_GR2\_o - r\_GR2\_i] < 0$ where f_GR1_o is a focal length of a lens element situated on the object side of the optical axis changing element in the first lens unit;

fm is $(fw \times ft)^{1/2}$;

fw is an overall focal length of the magnification varying optical system at the wide-angle end;

ft is an overall focal length of the magnification varying optical system at the telephoto end;

r_GR2_o is a radius of curvature of an object side surface of the most object side positive lens element in the second lens unit; and r_GR2_i is a radius of curvature of an image side surface of the most object side positive lens element in the second lens unit, wherein focusing is performed by movement of the third lens unit.

* * * * *